United States Patent
Tomlinson et al.

(10) Patent No.: US 12,243,267 B2
(45) Date of Patent: Mar. 4, 2025

(54) METHODS AND SYSTEMS FOR OBTAINING IMAGE DATA OF A VEHICLE FOR AUTOMATIC DAMAGE ASSESSMENT

(71) Applicant: STATE FARM MUTUAL AUTOMOBILE INSURANCE COMPANY, Bloomington, IL (US)

(72) Inventors: Shane Tomlinson, Bloomington, IL (US); Jennifer Malia Andrus, Seattle, WA (US); Marigona Bokshi-Drotar, Mckinney, TX (US); Holly Lambert, Roswell, GA (US); Daniel J. Green, Bloomington, IL (US); Michael Bernico, Bloomington, IL (US); Bradley A. Sliz, Deerfield, IL (US); He Yang, The Colony, TX (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 29 days.

(21) Appl. No.: 17/402,312

(22) Filed: Aug. 13, 2021

(65) Prior Publication Data
US 2021/0374997 A1 Dec. 2, 2021

Related U.S. Application Data

(63) Continuation of application No. 16/009,899, filed on Jun. 15, 2018, now Pat. No. 11,120,574.

(51) Int. Cl.
*G06T 7/73* (2017.01)
*G06Q 10/10* (2023.01)
(Continued)

(52) U.S. Cl.
CPC ............... *G06T 7/75* (2017.01); *G06Q 10/10* (2013.01); *G06Q 30/0283* (2013.01);
(Continued)

(58) Field of Classification Search
CPC .... G06K 2209/23; G06Q 10/20; G06Q 40/08; G06T 7/0004
See application file for complete search history.

(56) References Cited

U.S. PATENT DOCUMENTS

| 7,809,587 B2 | 10/2010 | Dorai et al. |
| 9,830,748 B2 | 11/2017 | Rosenbaum |

(Continued)

FOREIGN PATENT DOCUMENTS

| CN | 105956667 A | 9/2016 |
| CN | 106504248 A | 3/2017 |

(Continued)

OTHER PUBLICATIONS

Chengdu et al.; English Translation of CN106504248; Mar. 15, 2017.

(Continued)

*Primary Examiner* — Ross Varndell
(74) *Attorney, Agent, or Firm* — Lee & Hayes, P.C.

(57) ABSTRACT

A system and computer-implemented method for facilitating a user of a mobile device obtaining image data of damage to a vehicle for damage assessment includes capturing image data of a vehicle with the mobile device. The mobile device may include an orientation model for capturing the image data. The captured image data is analyzed, and a determination is made of the orientations of the images of the captured image data. In addition, a determination is made as to whether the captured image data can be used for the damage assessment. The captured image data may then be transmitted to a damage estimator computing device for estimating an amount of damage to the vehicle.

23 Claims, 29 Drawing Sheets

(51) Int. Cl.
*G06Q 30/0283* (2023.01)
*G06Q 40/08* (2012.01)
*H04N 23/60* (2023.01)

(52) U.S. Cl.
CPC .... *G06Q 40/08* (2013.01); *G06T 2207/10004* (2013.01); *G06T 2207/10016* (2013.01); *G06T 2207/20081* (2013.01); *G06T 2207/20084* (2013.01); *H04N 23/64* (2023.01)

(56) References Cited

U.S. PATENT DOCUMENTS

| | | | |
|---|---|---|---|
| 9,990,782 | B2 | 6/2018 | Rosenbaum |
| 10,269,190 | B2 | 4/2019 | Rosenbaum |
| 10,319,094 | B1* | 6/2019 | Chen ................ G06T 7/0026 |
| 10,467,824 | B2 | 11/2019 | Rosenbaum |
| 10,914,605 | B1* | 2/2021 | Chen ................ G06K 9/6289 |
| 11,120,574 | B1* | 9/2021 | Tomlinson ............ G06T 7/0004 |
| 11,227,452 | B2 | 1/2022 | Rosenbaum |
| 11,407,410 | B2 | 8/2022 | Rosenbaum |
| 11,524,707 | B2 | 12/2022 | Rosenbaum |
| 11,594,083 | B1 | 2/2023 | Rosenbaum |
| 2015/0103170 | A1* | 4/2015 | Nelson ................ G06Q 10/20 348/148 |
| 2016/0259994 | A1 | 9/2016 | Ravindran et al. |
| 2017/0221110 | A1 | 8/2017 | Sullivan et al. |
| 2017/0293894 | A1 | 10/2017 | Taliwal et al. |
| 2018/0082378 | A1* | 3/2018 | Kelsh ................ G06Q 30/0283 |
| 2019/0244301 | A1* | 8/2019 | Seth ................ G06F 16/73 |
| 2022/0092893 | A1 | 3/2022 | Rosenbaum |
| 2022/0340148 | A1 | 10/2022 | Rosenbaum |
| 2023/0060300 | A1 | 3/2023 | Rosenbaum |

FOREIGN PATENT DOCUMENTS

| | | |
|---|---|---|
| EP | 3239686 | 11/2017 |
| EP | 3578433 A1 | 4/2019 |
| EP | 3730375 A1 | 4/2020 |
| EP | 3960576 A1 | 3/2022 |
| EP | 4190659 | 6/2023 |
| EP | 4190660 A1 | 6/2023 |
| WO | 2017/055878 A1 | 4/2017 |

OTHER PUBLICATIONS

Nia, Karoon Rashedi; Automatic Building Damage Assessment Using Deep Learning and Ground-Level Image Data; Thesis submitted to Simon Fraser University; Jan. 20, 2017.

Wang et al.; English Translation of CN105956667; Sep. 21, 2016.

* cited by examiner

METHODS AND SYSTEMS FOR OBTAINING IMAGE DATA OF A VEHICLE FOR AUTOMATIC DAMAGE ASSESSMENT

CROSS-REFERENCE TO RELATED APPLICATIONS

This application is a continuation of, and claims the benefit of, U.S. patent application Ser. No. 16/009,899, filed Jun. 15, 2018, the contents of which are hereby incorporated by reference, in their entirety and for all purposes, herein.

FIELD

The present disclosure generally relates to obtaining image data of a vehicle for automatic assessment of vehicle damage and, more particularly, to a network-based system and method for assessing damage of a vehicle based on image data captured by a mobile device.

BACKGROUND

Generally, when a vehicle is damaged in an accident or vehicular crash, the damaged vehicle is transported by the owner to an automotive repair facility for an appraisal of the damage and an estimated cost to repair the vehicle. If the vehicle is drivable, the owner may visit his/her insurance provider for an appraisal of the damage and estimate. Typically, such an appraisal or inspection is necessary to determine which parts of the vehicle need to be repaired and/or replaced. Generating a repair estimate for the damage to the vehicle, however, is subjective and often contains errors. In addition, the estimates may be biased one way or the other depending on whether the repair facility or the insurance provider provided the estimate.

In addition, a vehicle inspection can take a long time and may be quite labor intensive. After the inspection is completed, the information is typically forwarded to another person who generates the estimate. The estimate must be forwarded to the insurance provider if completed by a repair facility and approved before work may begin on the vehicle. If the insurance provider generated the estimate, it may be less accurate than one provided by a repair facility and may subsequently require a supplement from the repair facility before the repair can be completed. This process can be quite inefficient, has many limitations, and is generally inconsistent. Such limitations, inefficiencies, and inconsistencies often result in increased costs and time to complete vehicle repairs.

BRIEF SUMMARY

Aspects of the present invention solve at least some of the above-described problems by providing more efficient and accurate methods for assessing vehicle damage. In one aspect, a computer-implemented method for obtaining image data of a vehicle for damage assessment is provided. The method includes capturing image data of a vehicle with a mobile device operated by a user. The mobile device includes an orientation model for capturing the image data. The method also includes analyzing the captured image data and determining an orientation of the captured image data. Moreover, the method includes determining whether the captured image data can be used for the damage assessment. The method also includes transmitting the image data to a damage estimator computing device.

In another aspect, a damage assessment computing system for obtaining image data of a vehicle for damage assessment is provided. The system includes a damage estimator computing device and a user mobile device. The user mobile device includes a memory device for storing data, one or more sensors for capturing image data, and a processor coupled to the memory device and the one or more sensors. The processor is programmed to capture image data of a vehicle using the one or more sensors. In addition, the processor is programmed to analyze the captured image data using an orientation model stored in the memory device. The processor is also programmed to determine an orientation of the captured image data using the orientation model and determine whether the image data can be used for the damage assessment. Moreover, the processor is programmed to transmit the image data to the damage estimator computing device.

In yet another aspect, one or more non-transitory computer-readable storage media having computer-executable instructions embodied thereon are provided. When executed by at least one processor, the computer-executable instructions cause the processor to capture image data of a vehicle using the one or more sensors. In addition, the computer-executable instructions cause the processor to analyze the captured image data using an orientation model stored in the memory device and determine an orientation of the captured image data using the orientation model. Moreover, the computer-executable instructions cause the processor to determine whether the image data can be used for the damage assessment. Furthermore, the computer-executable instructions cause the processor to transmit the image data to the damage estimator computing device.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWINGS

The figures described below depict various aspects of systems and methods disclosed therein. Each figure depicts an embodiment of a particular aspect of the disclosed devices and methods, and each of the figures is intended to accord with a possible embodiment thereof. Further, wherever possible, the following description refers to the reference numerals included in the following figures, in which features depicted in multiple figures are designated with consistent reference numerals. The present embodiments are not limited to the precise arrangements and instrumentalities shown in the figures.

The features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein. The drawings are not necessarily to scale, emphasis instead being placed upon clearly illustrating the principles of the embodiments of this disclosure.

DETAILED DESCRIPTION

The following detailed description of embodiments of the disclosure references the accompanying drawings. The embodiments are intended to describe aspects of the disclosure in sufficient detail to enable those skilled in the art to practice the disclosure. Other embodiments can be utilized and changes can be made without departing from the scope of the claims. The following detailed description is, therefore, not to be taken in a limiting sense. The scope of the present disclosure is defined only by the appended claims, along with the full scope of equivalents to which such claims are entitled.

Figure 1:
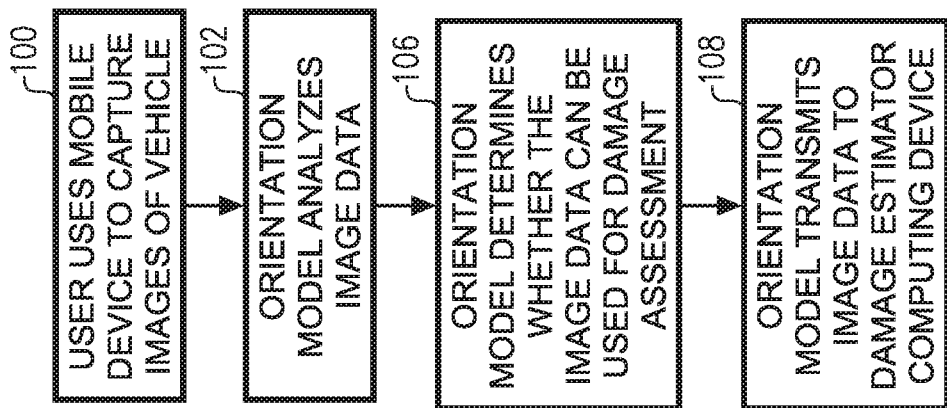
FIG. 1 is an exemplary flowchart of operations associated with using and/or performed by an embodiment of a method for facilitating a user of a mobile device obtaining image data of damage to a vehicle for damage assessment.

Referring to FIG. 1, the present embodiments may relate to, inter alia, a mobile application configured to cooperate with a damage assessment model to allow users of mobile devices to quickly and easily obtain insurance claim information and/or open an insurance claim for vehicles based upon images captured by the mobile application of the insured vehicle. More broadly, the mobile application may be configured to allow users of mobile devices to quickly and easily obtain insurance claim information and/or initiate an insurance claim for any kind of real or personal property based upon images captured by the mobile application of the insured real or personal property.

In one embodiment, shown in FIG. 1, a user may use a mobile device to capture images of a vehicle, as shown in step 100. In particular, the user may launch a mobile application (i.e., a computer program configured for use on a mobile operating system or mobile computing device) to facilitate obtaining images of the vehicle for transmitting to a remote computer system. The mobile application contains an orientation model to facilitate capturing the images. The orientation model analyzes the captured image data, as shown in step 102. The orientation model may scan the captured images and determine an orientation of the image data, as shown in step 104. Determining the orientation of the image data may include, for example, determining the orientation of the vehicle captured in the captured image data. For example, and without limitation, the captured image data may contain a plurality of images of the vehicle. Each image may be taken from a different vantage point, such as, the right front corner of the vehicle, the left front corner of the vehicle, the interior of the vehicle, the vehicle identification number (VIN), etc. The orientation model determines whether the captured image data can be used for the damage assessment of the vehicle, as shown in step 106. The orientation modal may transmit the captured image data to a damage estimator computing device, as shown in step 108. The orientation model may be incorporated into an existing application, such as State Farm's Pocket Agent® mobile app, or a new application. Thus, the embodiment facilitates a user capturing images of damage to the user's vehicle and uploading the data to his/her insurance provider, and thereby may eliminate the need to bring the vehicle to an appraiser or having the insurance provider send an appraiser to inspect the vehicle.

Figure 2:
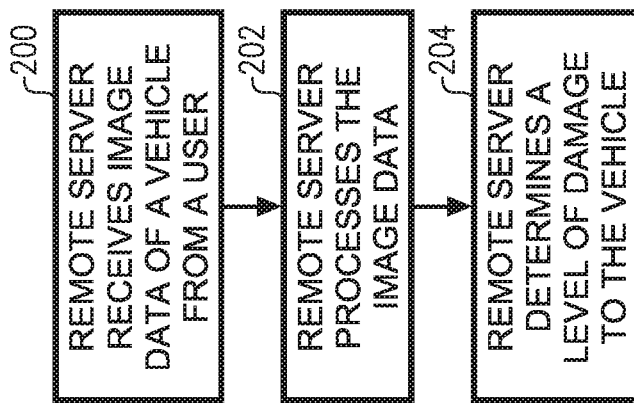
FIG. 2 is an exemplary flowchart of operations associated with using and/or performed by an embodiment of a method for vehicle damage assessment.

In another embodiment, shown in FIG. 2, a remote server may receive captured image data of a vehicle from a user, as shown in step 200. In particular, the image data may be captured by the user using a mobile device. The mobile device may include an orientation model configured to assist the user in the image capture operation. The remote server processes the image data, as shown in step 202. Specifically, the remote server processes the image data using a damage assessment model running on the remote server. The damage assessment model includes a machine learning program that is trained to identify damage of the vehicle based on the received image data. The damage assessment model may perform modeling and analysis tasks including, for example, and without limitation, classification, regression, estimation, prediction, and detection. At step 204, the remote server determines a level of damage to the vehicle based on the processed image data. For example, the remote server, using the damage assessment model, estimates external damage to a first set of parts of the vehicle (i.e., those parts that are visible in the image data) and infers internal damage to a second set of parts of the vehicle, i.e., those parts that are not visible in the image data, but are likely damaged based on the first set of parts.

Figure 3:
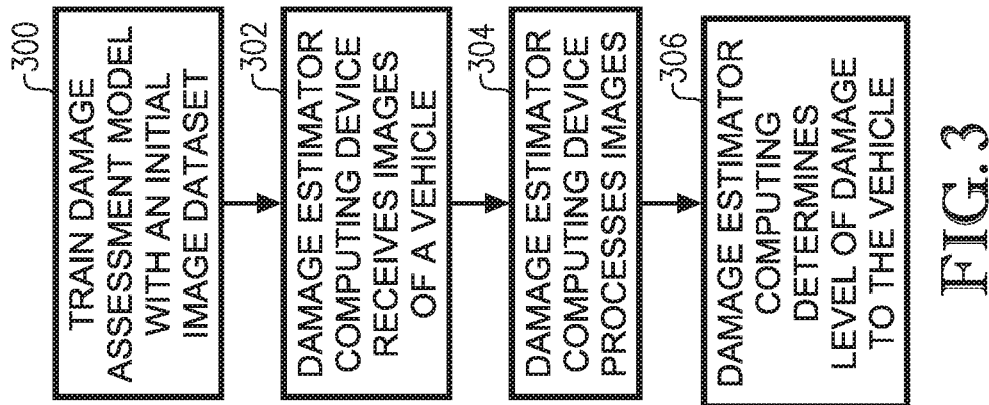
FIG. 3 is an exemplary flowchart of operations associated with using and/or performed by an embodiment of a method for determining a level of damage of a vehicle.

In an embodiment shown in FIG. 3, a computer-implemented method for determining a level of damage of a vehicle is shown. At step 300, a damage assessment model running on a damage estimator computing device is trained with an initial image dataset of damaged vehicles. The initial image dataset may be compiled from historical images of previously filed claims for an insurance provider. The images may include metadata identifying, for example, the make, model, and year of the vehicle, as well as the associated claim data, such as the claim number and the repair cost of the vehicle. At step 302, the damage estimator computing device may receive a plurality of images of a vehicle, provided, for example, by a user using a mobile device. The user may be an insured party of the insurance provider and may include damage for which the user is wanting to file a claim or receive an estimated cost for repair. The damage estimator computing device may process each of the images to determine a level of damage to the vehicle, as shown in step 304. Processing the images allows the damage estimator computing device to determine a level of damage to the vehicle, as shown in step 306.

Specific embodiments of the technology will now be described. The embodiments are intended to describe aspects of the invention in sufficient detail to enable those skilled in the art to practice the invention. Other embodiments may be utilized, and changes may be made without departing from the scope of the present invention. The following detailed description is, therefore, not to be taken in a limiting sense. The scope of the present invention is defined only by the appended claims, along with the full scope of equivalents to which the claims are entitled.

I. Exemplary Computer System

Figure 4:
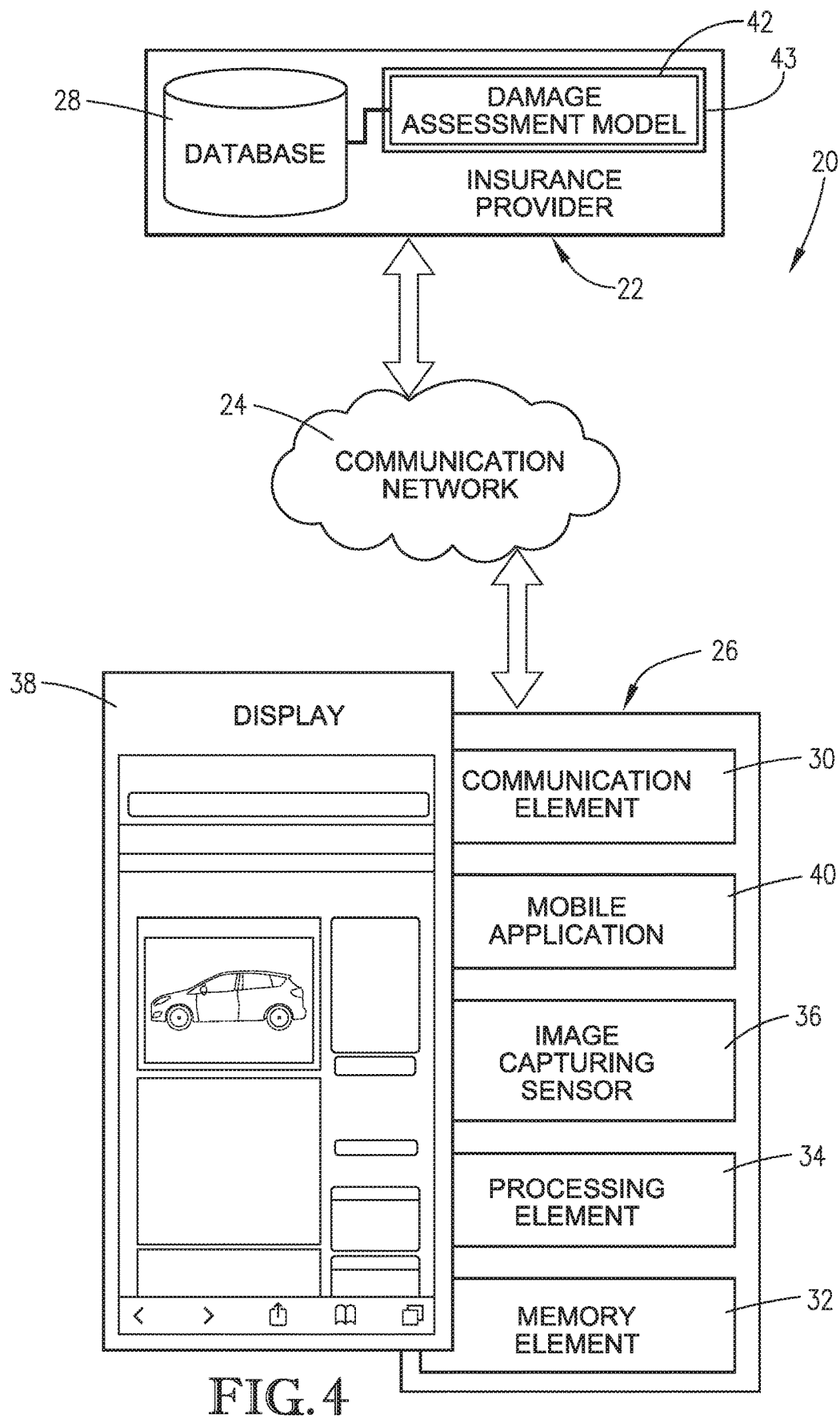
FIG. 4 is an exemplary computer system in which the methods shown in FIGS. 1-3 may operate.

FIG. 4 depicts an exemplary computing environment for an embodiment of the mobile application configured to cooperate with the damage assessment model to allow the user of the mobile device quickly and easily obtain insurance claim information and/or open an insurance claim for vehicles based upon images captured by the mobile application of the insured property. A computer system 20 may broadly comprise an insurance provider 22, a communication network 24, and the mobile device 26.

The insurance provider 22 may be substantially any provider of insurance for vehicles (or other forms of property, real or personal), such as State Farm Mutual Automobile Insurance Company. The insurance provider may maintain a database 28 of customer information about existing customers, which may include such information as each customer's name, age, address, driving history, insurance history, number and type of vehicles insured, and/or number of miles each vehicle is driven in a particular time period (e.g., per year, per six months, etc.). In addition, the insurance provider 22 may maintain and operate a damage assessment model 42 for assessing damage of a vehicle based on a plurality of received image data associated with the vehicle. The damage assessment model may be a predictive model including, for example, a machine learning program trained to identify vehicle damage, as is described herein. The damage assessment model 42 may be operated by one or more computing devices 43, such as a damage estimator computing device.

The communication network 24 may be embodied in a local, metro, or wide area network (LAN, MAN, or WAN) and may be formed using a plurality of known architectures and topologies. In some embodiments, a portion of the network 24 may be formed by at least a portion of the Internet, by communication lines that are leased from other entities, or by combinations thereof. The network 24 may be implemented within a small space, such as an office or a building, or across a larger space, such as a city, a region, or a country.

The mobile device 26 may be substantially any suitable mobile device, such as a tablet or smart phone. The mobile device 26 may have various hardware and software components including a communication element 30, a memory element 32, a processing element 34, an image capture sensor 36, a display 38, and/or a mobile application 40 (also referred to as herein as an orientation model).

The communication element 30 may generally allow for communication with external systems or devices, including those of the insurance provider 22. The communication element 30 may include signal or data transmitting and receiving circuits, such as antennas, amplifiers, filters, mixers, oscillators, digital signal processors (DSPs), and the like. The communication element 30 may establish communication wirelessly by utilizing radio-frequency (RF) signals and/or data that comply with communication standards such as cellular 2G, 3G, or 4G, IEEE 802.11 standard (such as WiFi), IEEE 802.16 standard (such as WiMAX), Bluetooth™, or combinations thereof. Alternatively or additionally, the communication element 30 may establish communication through connectors or couplers that receive metal conductor wires or cables which are compatible with networking technologies, such as Ethernet. In certain embodiments, the communication element 30 may also couple with optical fiber cables. The communication element 30 may be electronically coupled or otherwise in electronic communication with the memory element 32 and the processing element 34.

The memory element 32 may include data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, USB ports, or the like, or combinations thereof. The memory element 32 may include, or may constitute, a "computer-readable medium." The memory element 32 may store instructions, code, code segments, software, firmware, programs, applications, apps, services, daemons, or the like, including the mobile application 40, that are executed by the processing element 34. The memory element 32 may also store settings, data, documents, sound files, photographs, movies, images, databases, and the like.

The processing element 34 may include one or more processors, microprocessors, microcontrollers, DSPs, field-programmable gate arrays (FPGAs), analog and/or digital application-specific integrated circuits (ASICs), or the like, or combinations thereof. The processing element 34 may generally execute, process, or run instructions, code, code segments, software, firmware, programs, applications, apps, processes, services, daemons, or the like, including the mobile application 40. The processing element 34 may also include hardware components, such as finite-state machines, sequential and combinational logic, and other electronic circuits that may perform the functions necessary for the operation of embodiments of the current inventive concept. The processing element 34 may be in communication with the other components of the mobile device 26 through serial or parallel links that include address busses, data busses, control lines, and the like.

The image capture sensor 36 is included, which is representative of functionality to record images, such as still images, video, and so on. The image capture sensor 36 may include various image capture components, such as a lens, a mirror, an electronic image sensor, and so on. The image capture sensor 36 may be coupled in communication to the processing element 34 for executing the image recording functionality.

The display 38 may be substantially any suitable display configured to visually communicate information to the user of the mobile device 26. The display 38 may be implemented using any appropriate technology and design, such as light-emitting diode (LED), organic LED (OLED), Light Emitting Polymer (LEP) or Polymer LED (PLED), liquid crystal display (LCD), thin film transistor (TFT) LCD, LED side-lit or back-lit LCD, or the like, or combinations thereof. Furthermore, the display 38 may have substantially suitable shape; may possess a square or a rectangular aspect ratio which may be viewed in either a landscape or a portrait mode; and may further include a lens or other covering overlying all or part of the display 38 and configured to enhance the visibility of the information shown on the display 38.

The mobile application 40 may be stored in the memory element 32 and executed by the processing element 34 to perform substantially as follows. The user may first launch the mobile application 40. This may be accomplished, for example, by selecting the mobile application icon (not shown) from a list of application icons (not shown) on the display 38, as is well known in the art. The user may then initiate a claim or request for a repair estimate by submitting a plurality of images of his/her vehicle. In alternative embodiments, the user may submit images of any insured property to the insurance provider to initiating a claim or request for repair estimate.

Figure 5:
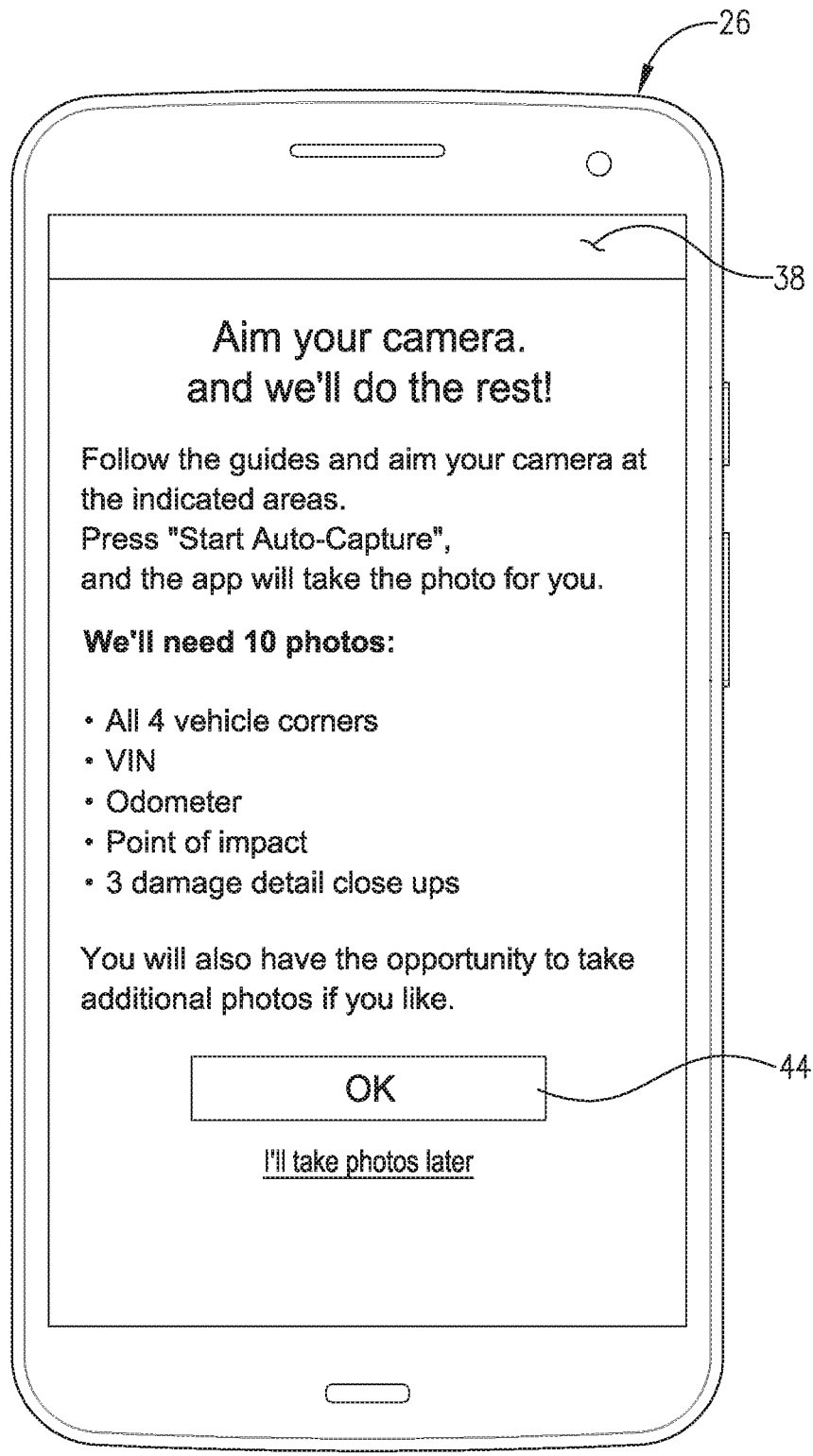
FIG. 5 is a depiction of an exemplary mobile device screen capture showing a first action in the operation of the mobile application.

In the exemplary embodiment, as shown in FIG. 5, the user may be provided with an overview of the image capture process, including instructions on using the mobile application 40 (or orientation model) to capture the images and a list of the images that are to be captured. The user may be allowed to select an "Ok" icon 44 or otherwise similarly indicate a desire to proceed and thereby begin the image capture process with the mobile application 40.

Figure 6:
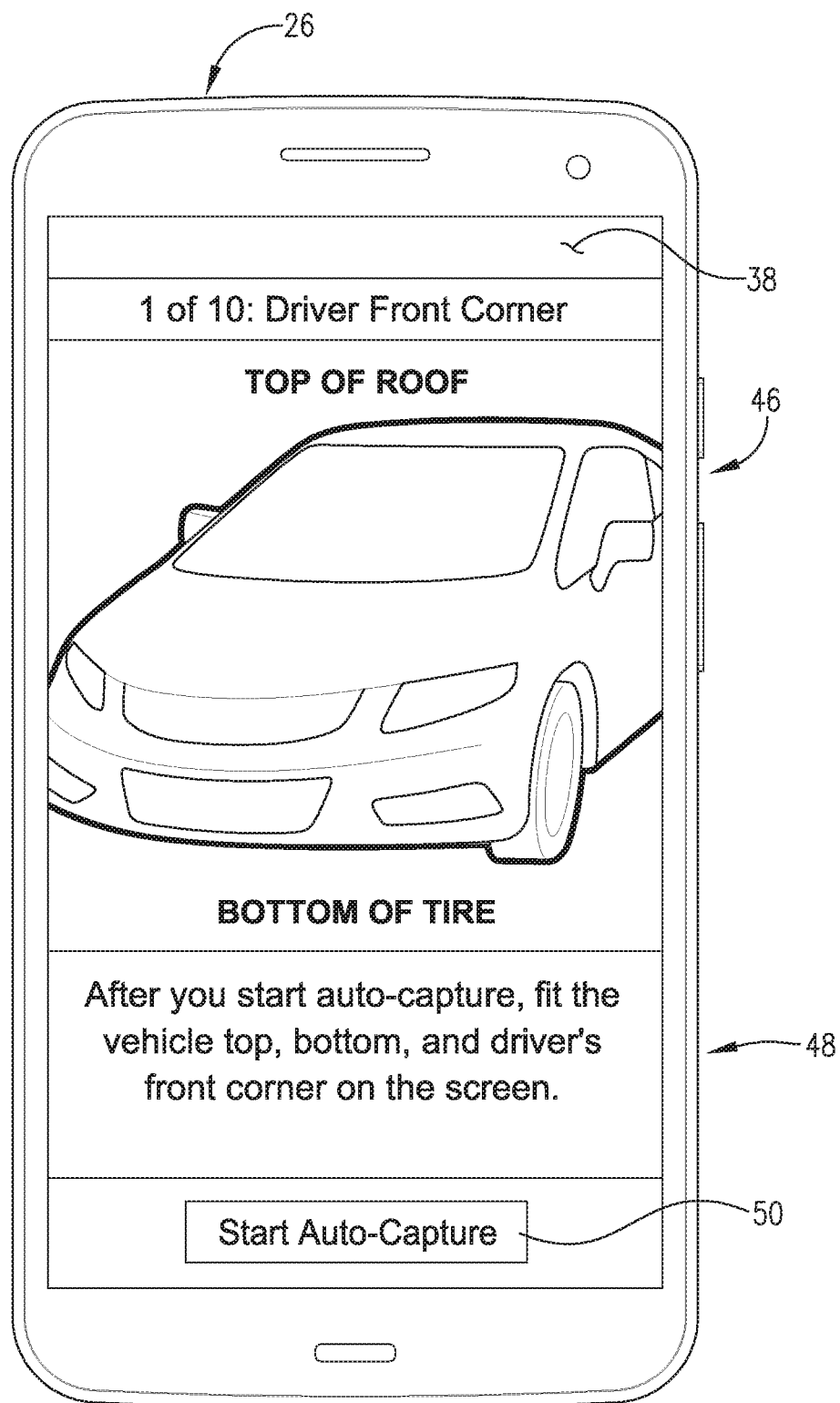
FIG. 6 is a depiction of an exemplary mobile device screen capture showing a second action in the operation of the mobile application.
Figure 7:
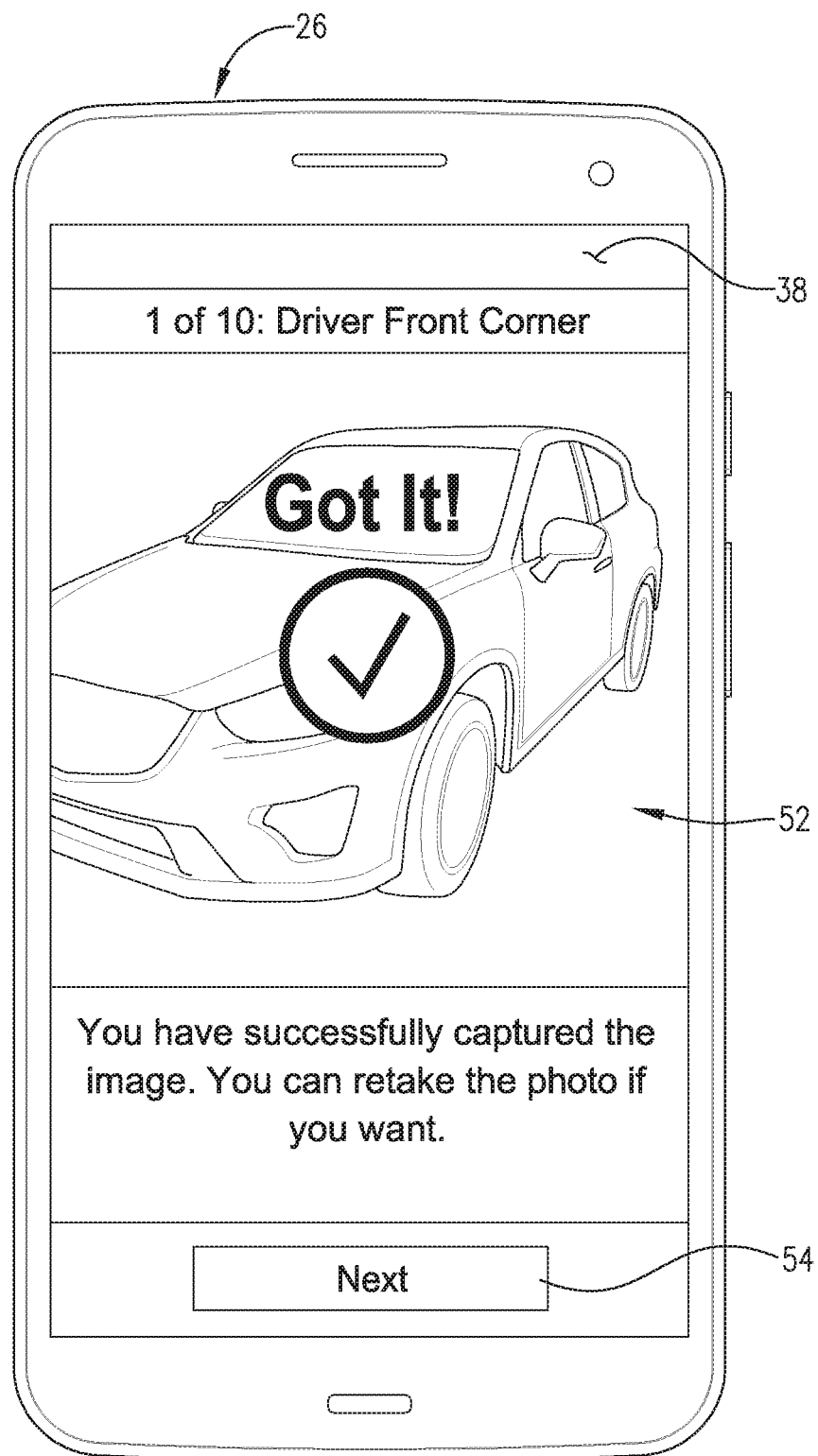
FIG. 7 is a depiction of an exemplary mobile device screen capture showing a captured image of a vehicle after completing the second action shown in FIG. 6.

As shown in FIG. 6, the user may be provided with a representative image of a certain pose 46 of a vehicle for capture along with an instruction 48 explaining the requested pose. The user may then be allowed to select a "Start Auto-Capture" icon 50 or otherwise similarly indicate a desire to begin the image capture of his/her vehicle representing the requested pose 46. After the user selects the "Start Auto-Capture" icon 50, the user will be presented with a live view 52 from the image capturing sensor 36 of the mobile device 26, as shown in FIG. 7. When the image of the vehicle in the live view 52 portion of the display 38 generally matches the requested pose 46 (e.g., vehicle top, bottom, and driver front corner as shown in FIG. 6), the image will be automatically captured by the mobile application 40. The user may then be allowed to select a "Next" icon 54 or otherwise similarly indicate a desire to continue the image capture of his/her by moving to the next requested image.

Figure 8:
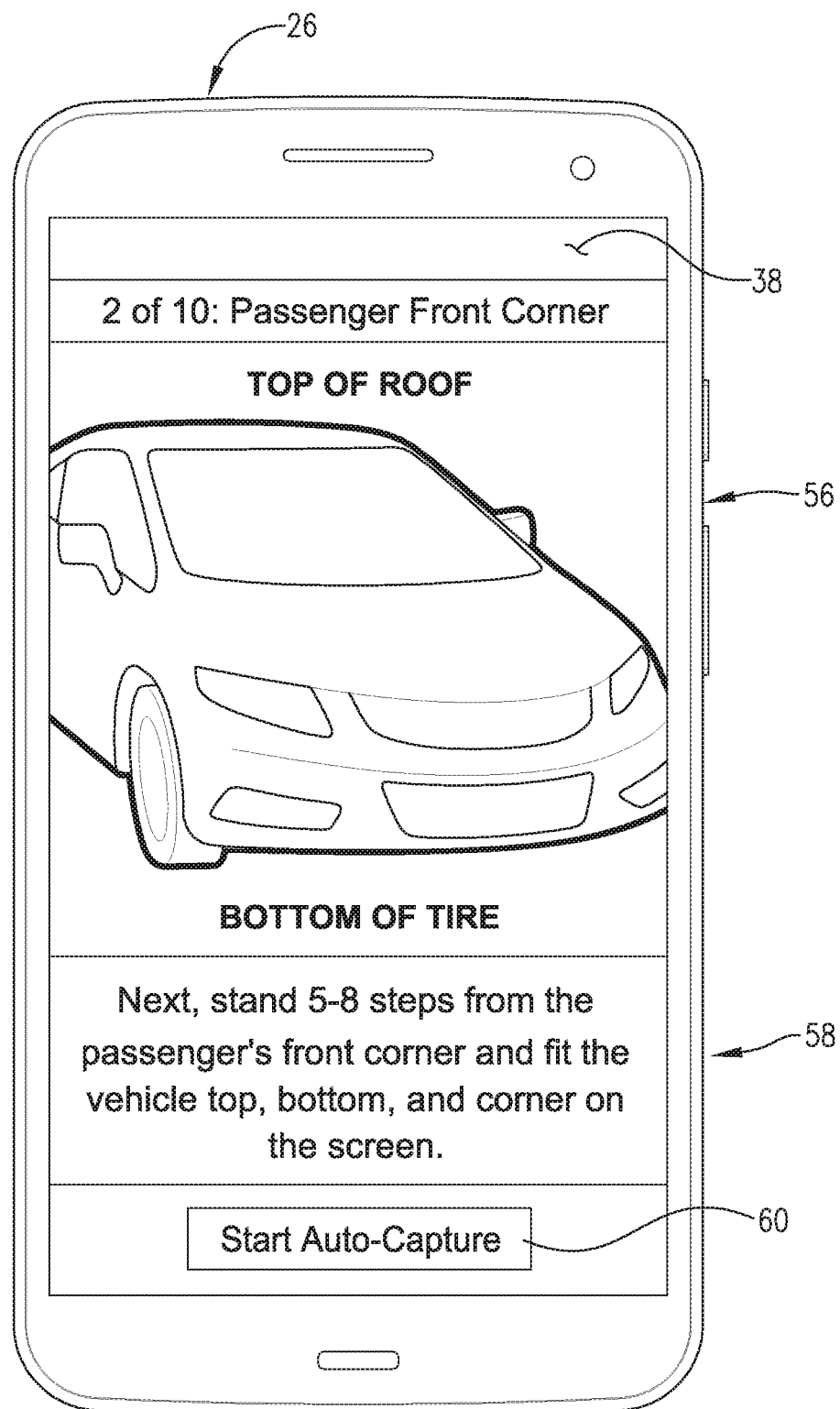
FIG. 8 is a depiction of an exemplary mobile device screen capture showing a third action in the operation of the mobile application.
Figure 9:
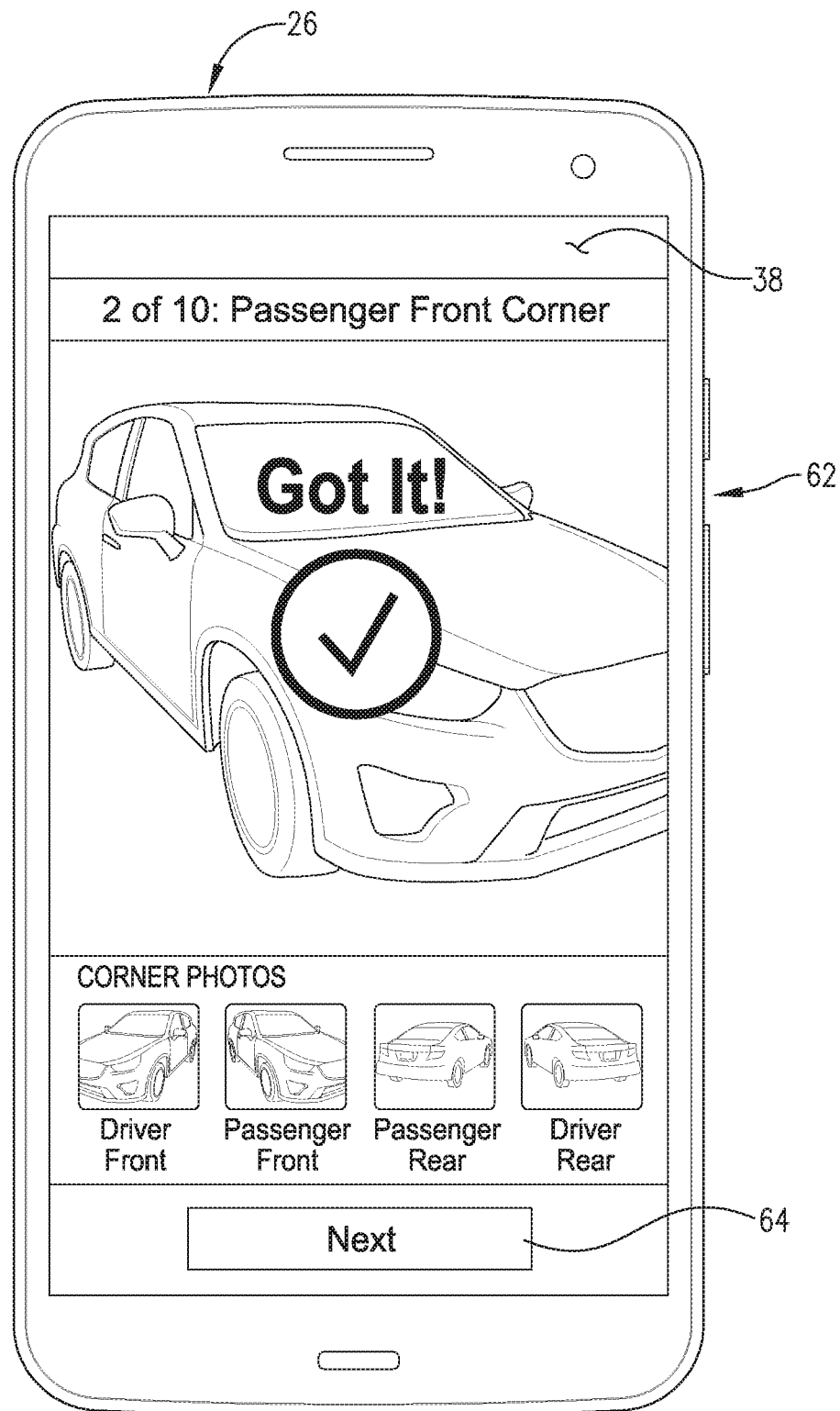
FIG. 9 is a depiction of an exemplary mobile device screen capture showing another captured image of the vehicle after completing the third action shown in FIG. 8.

The mobile application 40 may proceed to the next requested image, as shown in FIG. 8. The mobile application 40 may provide the user with another representative image of a certain pose 56 of a vehicle for capture along with an instruction 58 explaining the requested pose. The user may then again be allowed to select a "Start Auto-Capture" icon 60 or otherwise similarly indicate a desire to begin the image capture of his/her vehicle representing the requested pose 56. After the user selects the "Start Auto-Capture" icon 60, the user will be presented with a live view 62 from the image capturing sensor 36 of the mobile device 26, as shown in FIG. 9. When the image of the vehicle in the live view 62 portion of the display 38 generally matches the requested pose 56 (e.g., vehicle top, bottom, and passenger front corner as shown in FIG. 8), the image will be automatically captured by the mobile application 40. The user may then be allowed to select a "Next" icon 64 or otherwise similarly indicate a desire to continue the image capture of his/her by moving to the next requested image. The image capture process proceeds along similar steps until each of the requested images of the user's vehicle are obtained.

Figure 10:
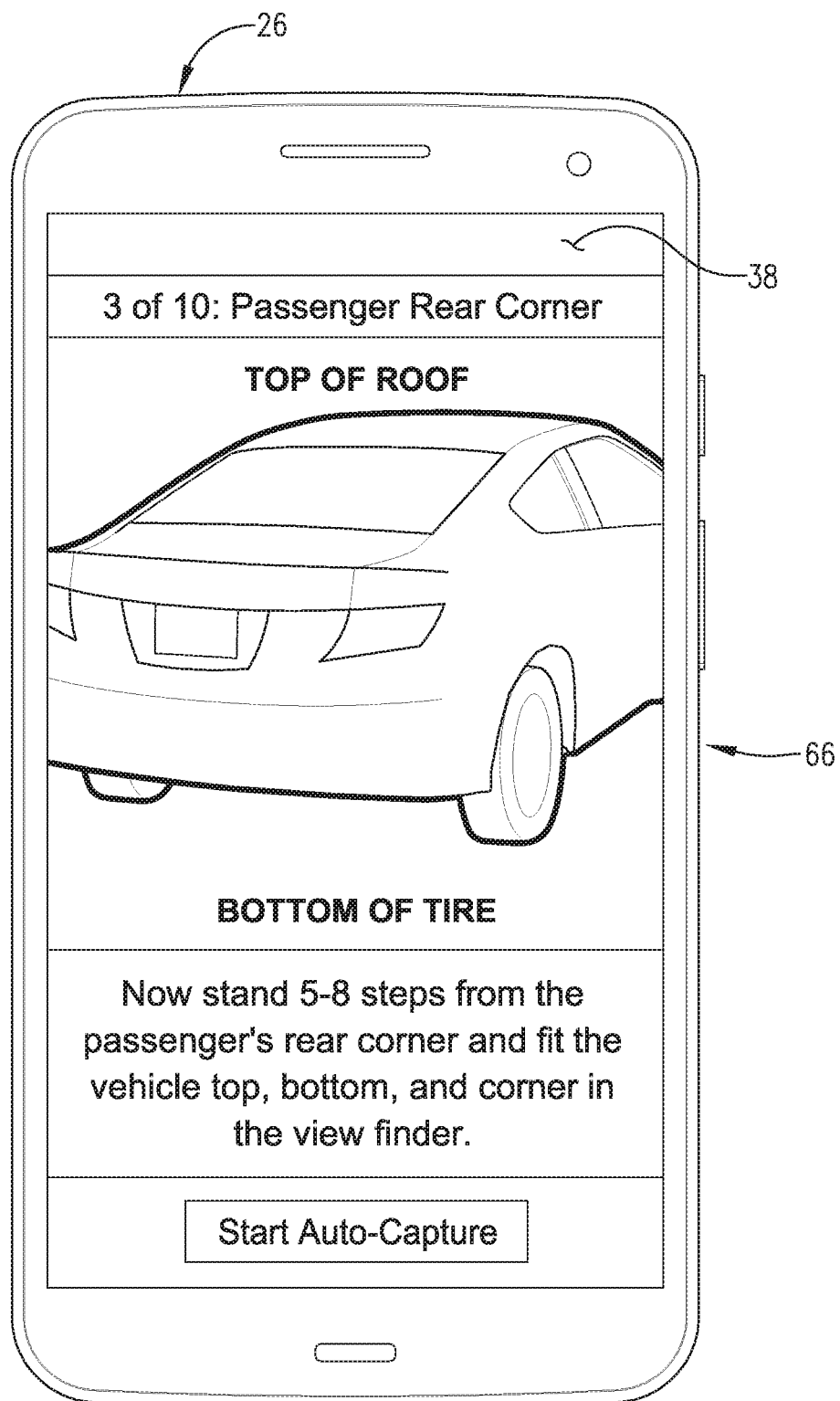
FIG. 10 is a depiction of an exemplary mobile device screen capture showing a fourth action in the operation of the mobile application.
Figure 11:
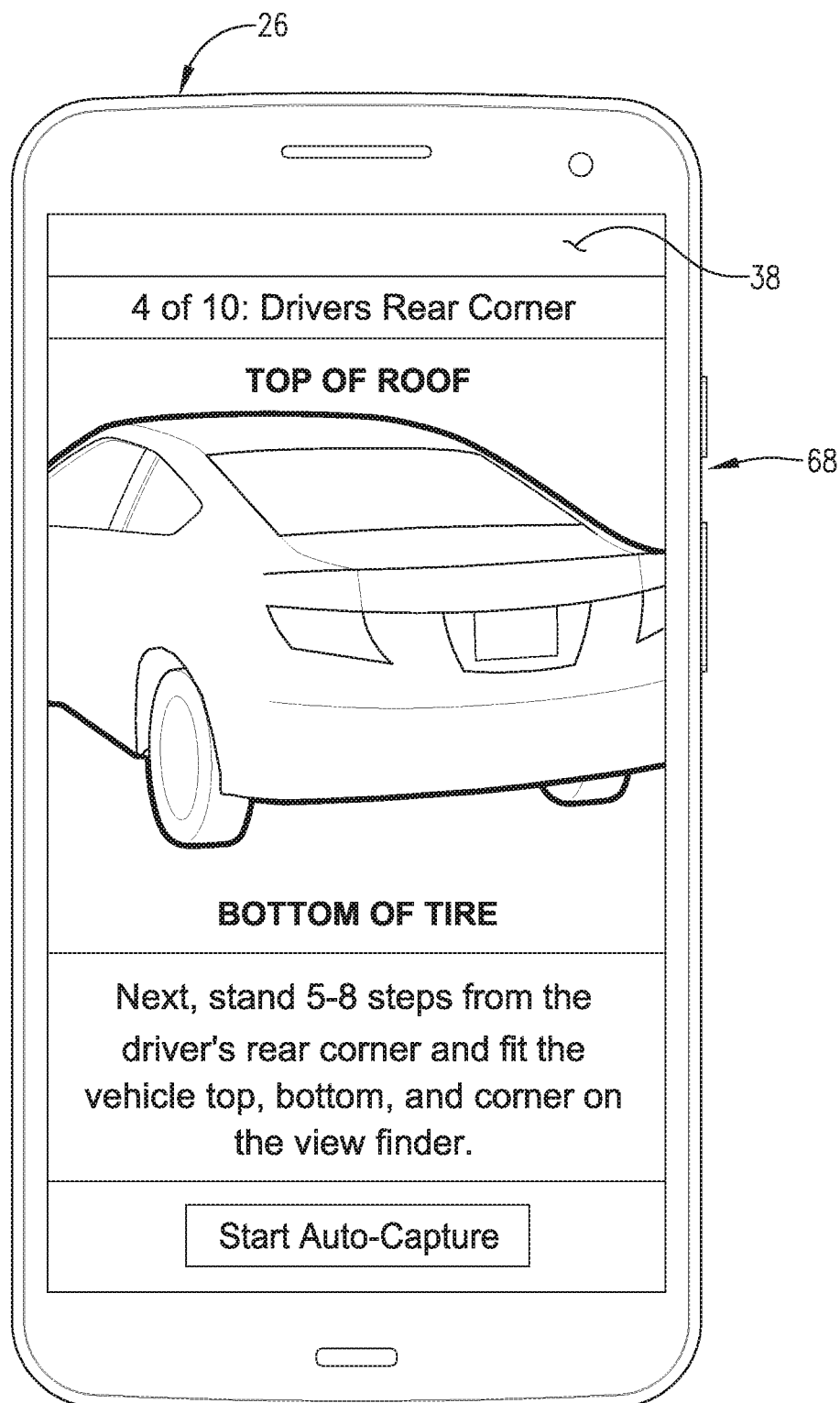
FIG. 11 is a depiction of an exemplary mobile device screen capture showing a fifth action in the operation of the mobile application.
Figure 12:
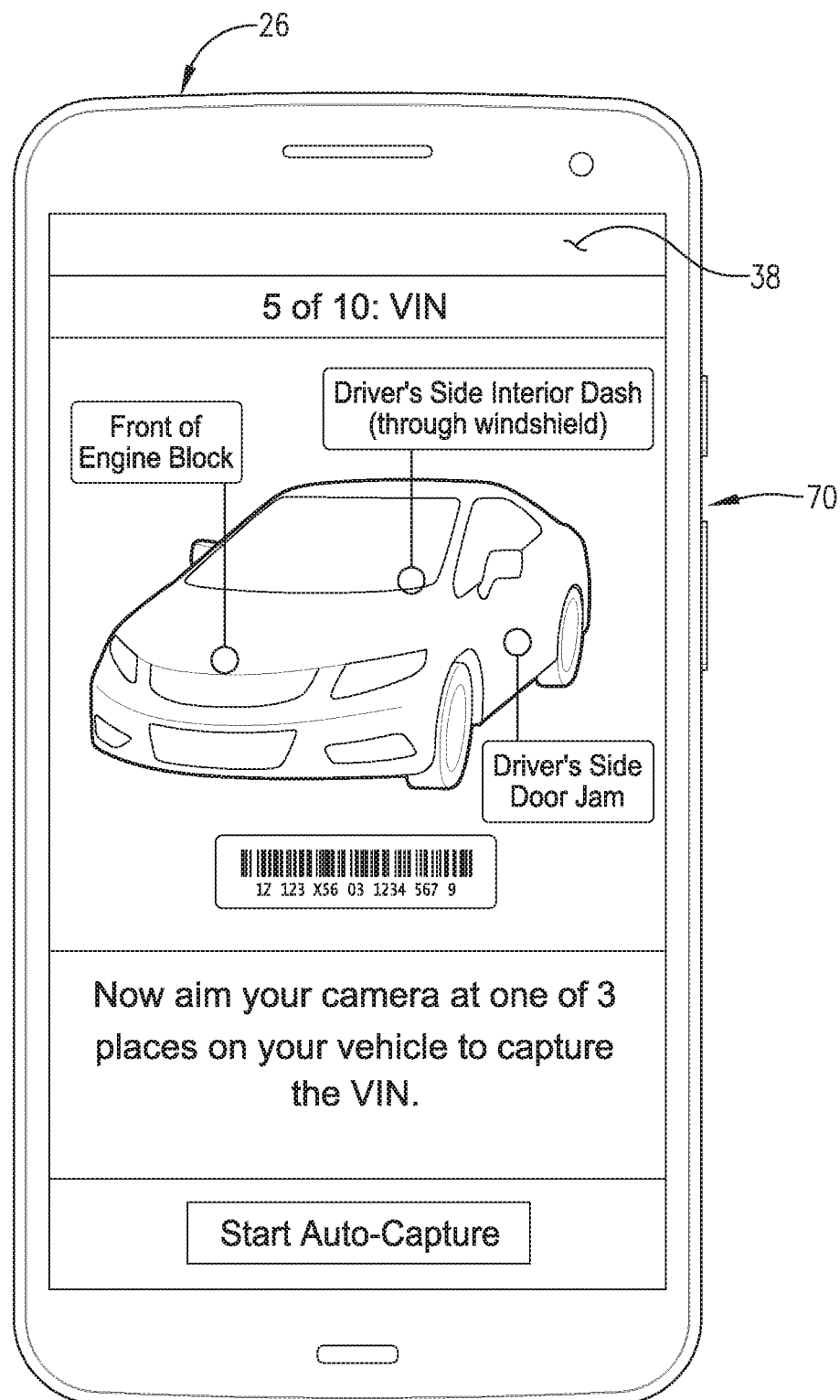
FIG. 12 is a depiction of an exemplary mobile device screen capture showing a sixth action in the operation of the mobile application.
Figure 13:
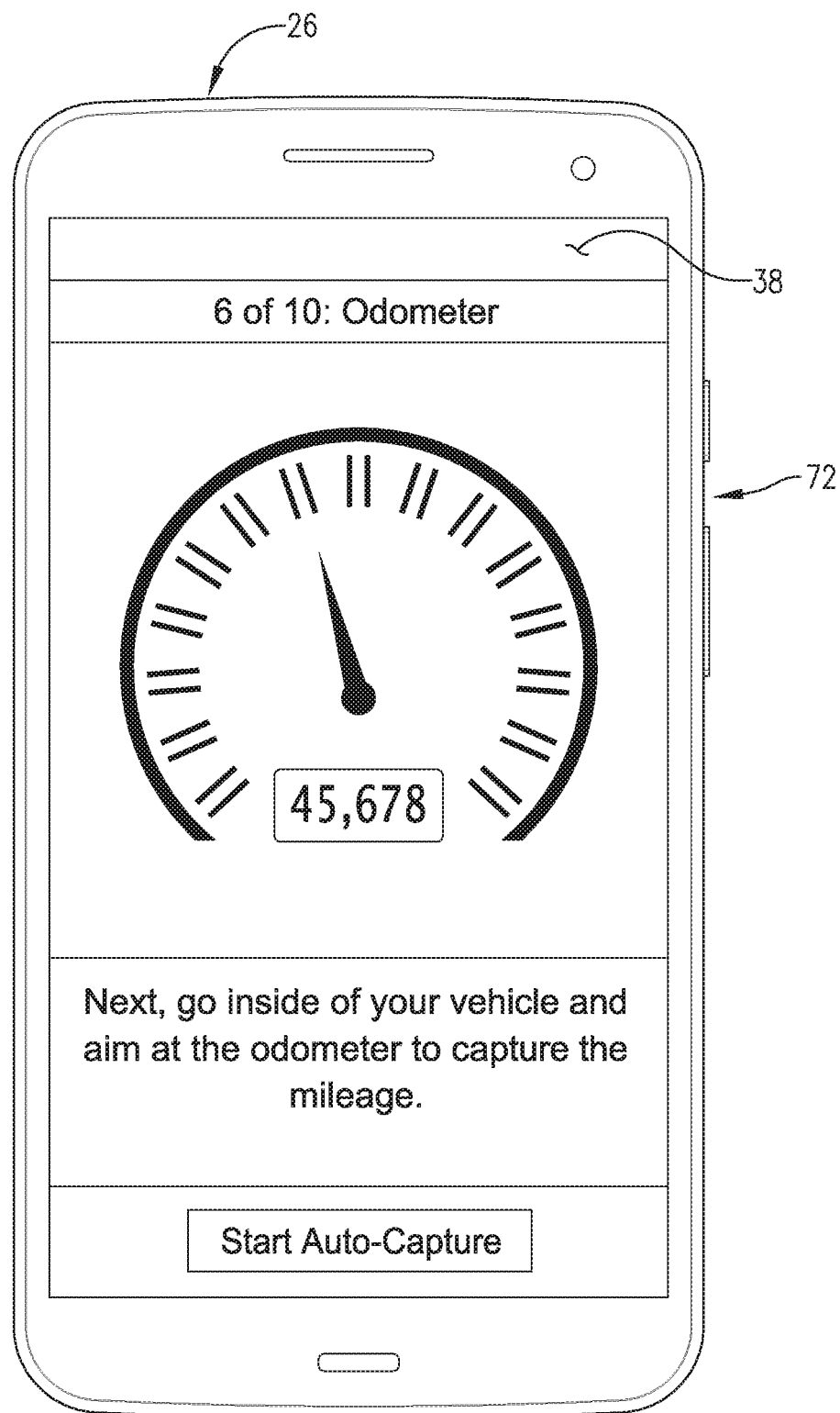
FIG. 13 is a depiction of an exemplary mobile device screen capture showing a seventh action in the operation of the mobile application.

FIGS. 10-15 illustrate several different requested poses of the user's vehicle for the image capture process. For example, and without limitation, FIG. 10 shows a requested rear passenger corner pose 66 and FIG. 11 shows a requested rear driver corner pose 68. FIG. 12 shows a request for the vehicle's vehicle identification number (VIN) and illustrates three potential locations 70 for capturing the VIN. In addition, FIG. 13 shows a request for the user to capture to odometer 72 of the vehicle so that the mileage of the vehicle may be imaged.

Figure 14:
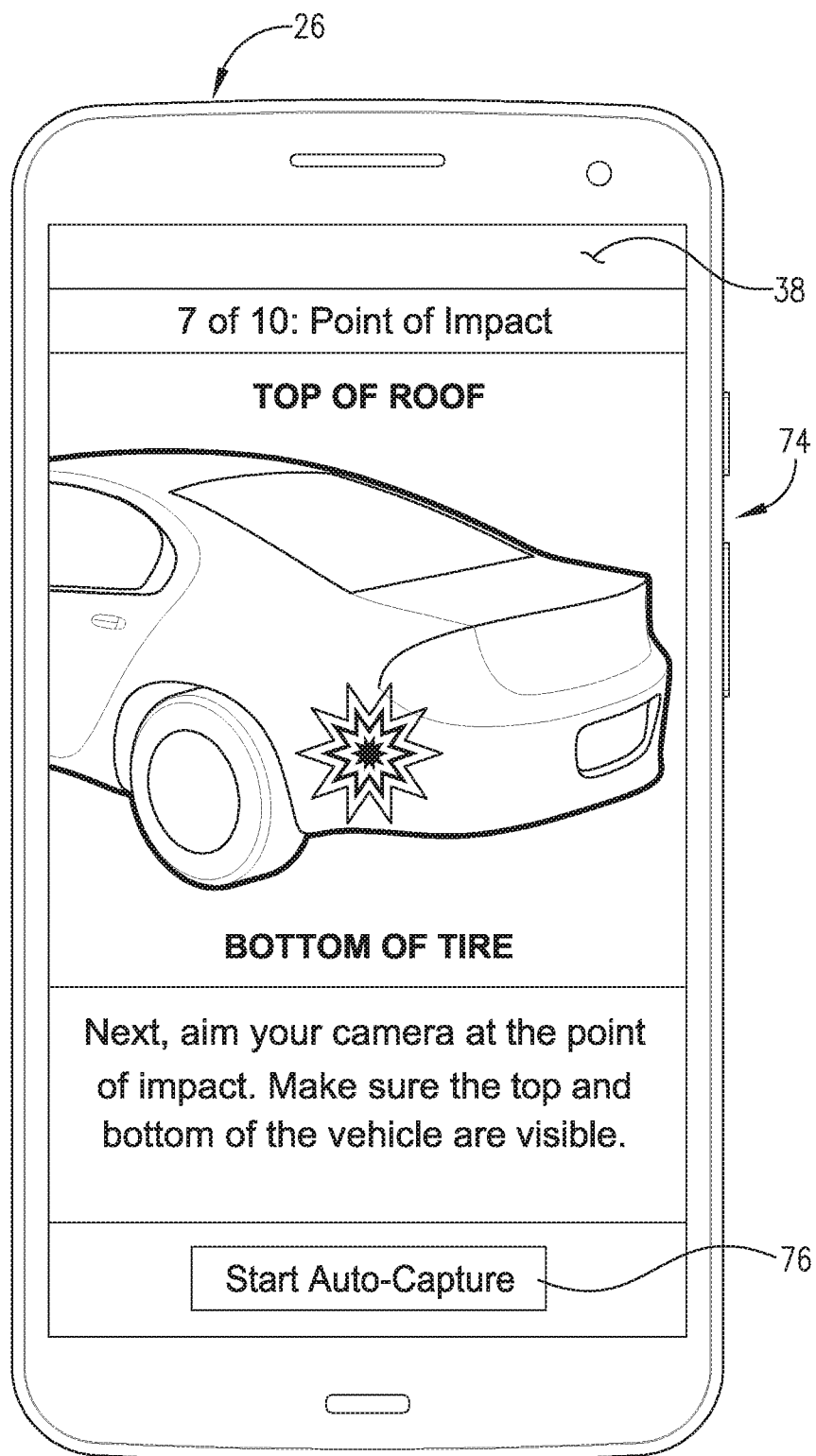
FIG. 14 is a depiction of an exemplary mobile device screen capture showing an eighth action in the operation of the mobile application.
Figure 15:
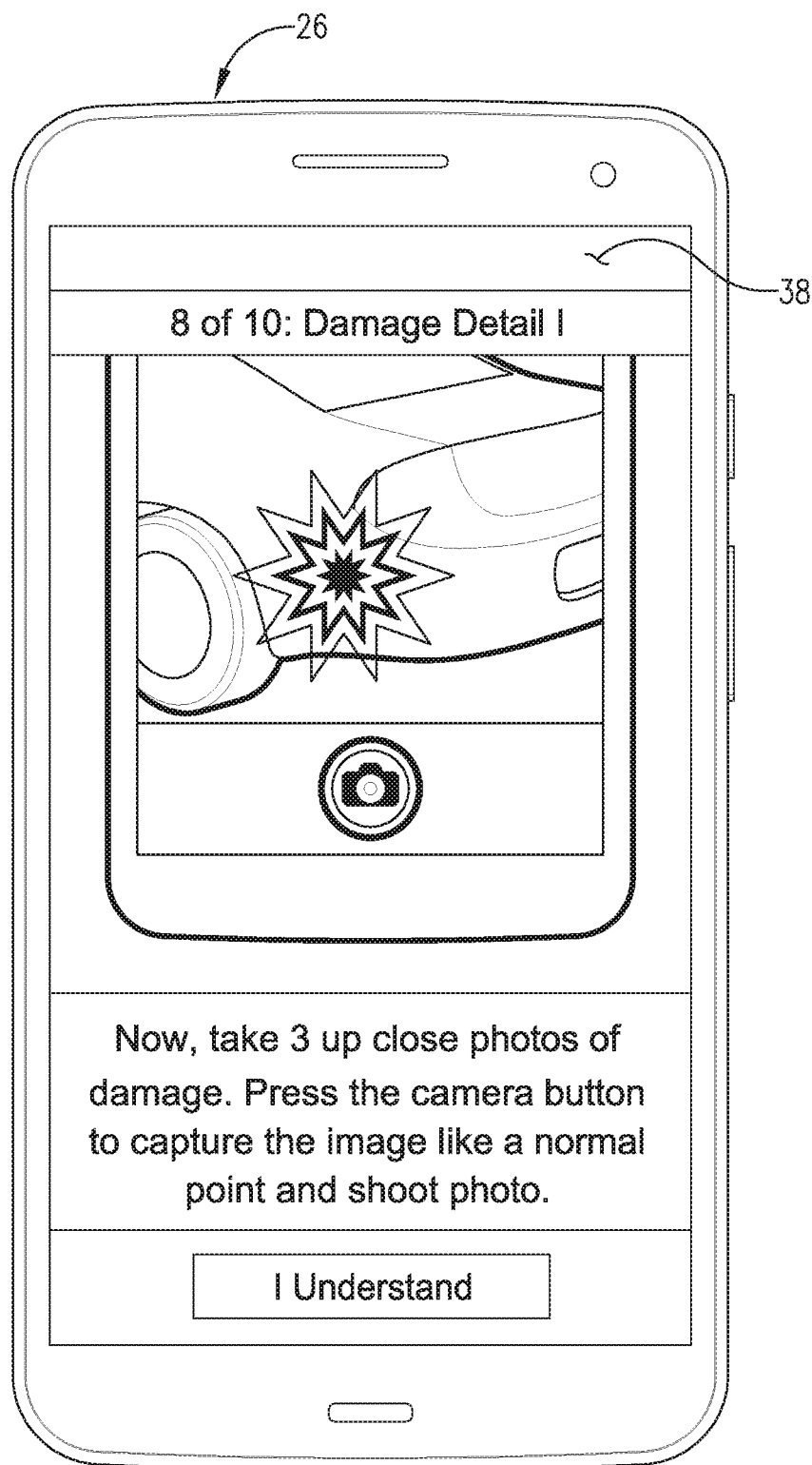
FIG. 15 is a depiction of an exemplary mobile device screen capture showing a ninth action in the operation of the mobile application.

The mobile application 40 may then proceed to the next requested image, as shown in FIG. 14. The mobile application 40 may provide the user with a representative image 74 requesting that the user capture the point of impact of his/her vehicle. The user may then be allowed to select a "Start Auto-Capture" icon 76 or otherwise similarly indicate a desire to begin the image capture of his/her vehicle representing the requested image 74. As shown in FIG. 15, the mobile application 40 may ask the user to capture one or more close up images of the damage to his/her vehicle. In the exemplary embodiment, the mobile application 40 may request three up close images, however, the mobile application 40 may be programmed to request any number, fewer or more, of close images that enable the mobile application 40 to function as described herein.

Figure 16:
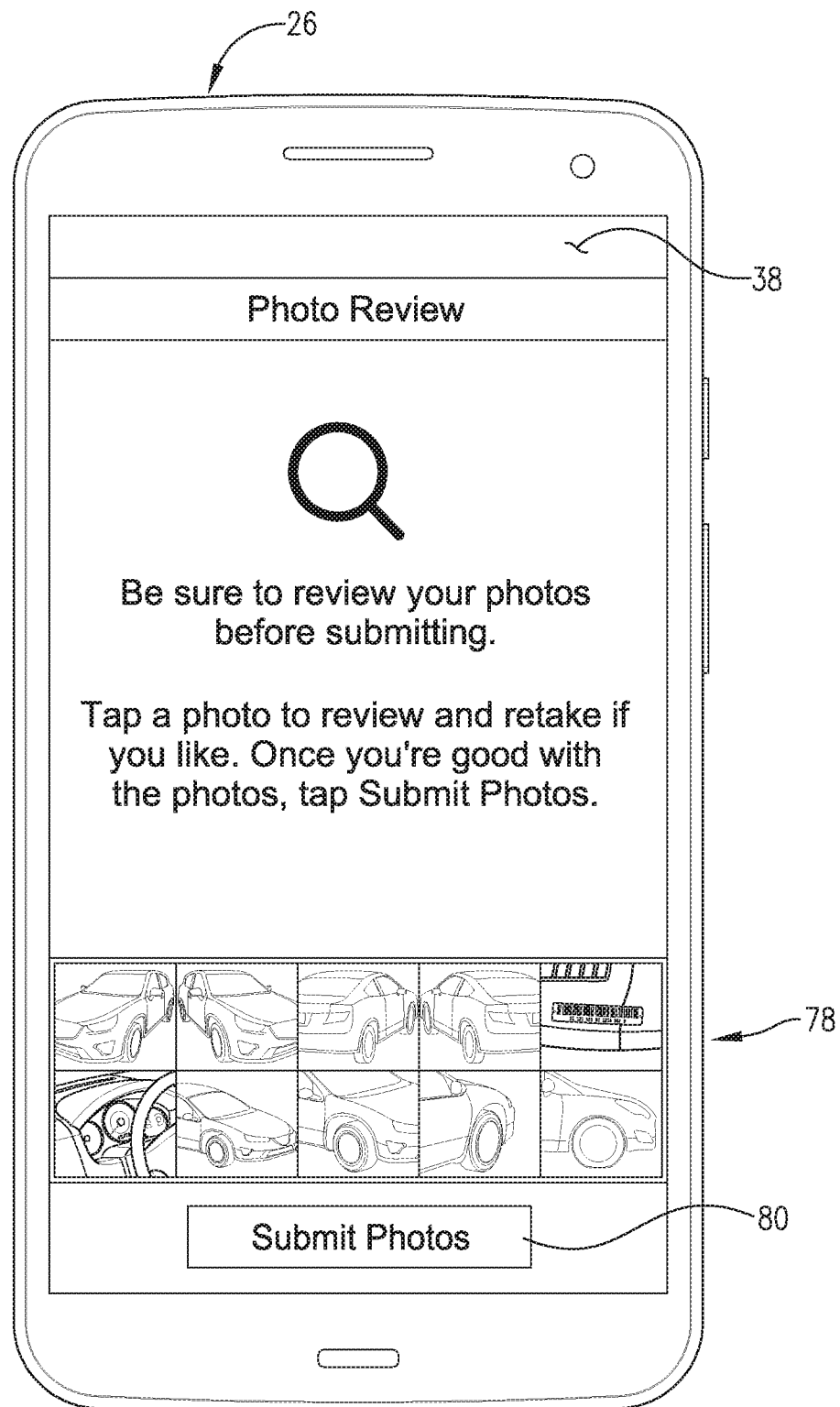
FIG. 16 is a depiction of an exemplary mobile device screen capture showing a submission page for reviewing and submitting images of the vehicle.

After each of the requested images are capture by the user using the mobile application 40, the user may be prompted to review the images prior to uploading them to the insurance provider, as in shown in FIG. 16. For example, and without limitation, the user may be presented with a plurality of icons 78 representing the captured images of the user's vehicle. The user may select each icon to review the captured image, and may initiate a retake of the selected image, if so desired. After the user is satisfied with the captured images, the user may select a "Submit Photos" icon 80 to submit (or upload) the captured images to the insurance provider.

Figure 17:
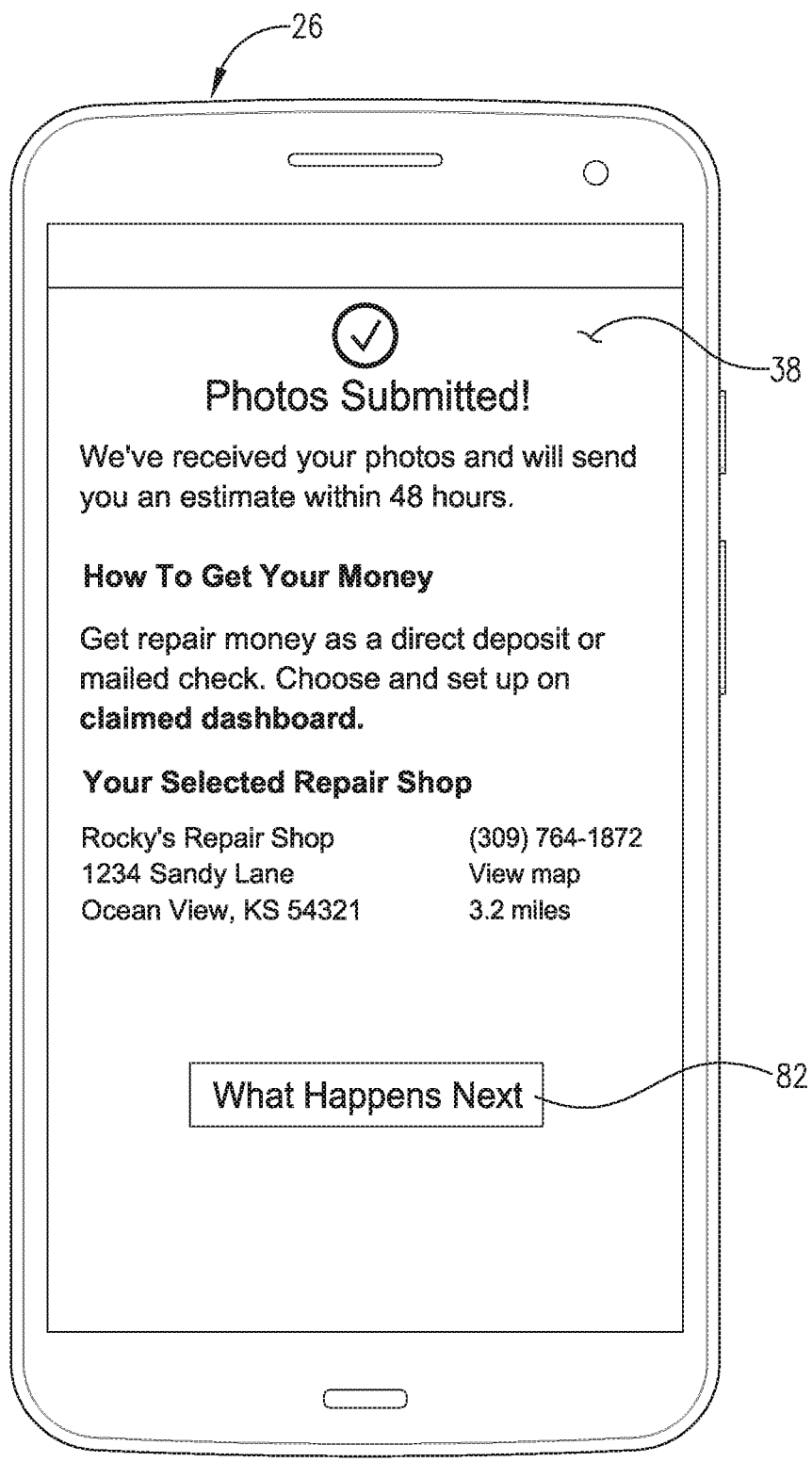
FIG. 17 is a depiction of an exemplary mobile device screen capture showing an information page after submission of the images.
Figure 18:
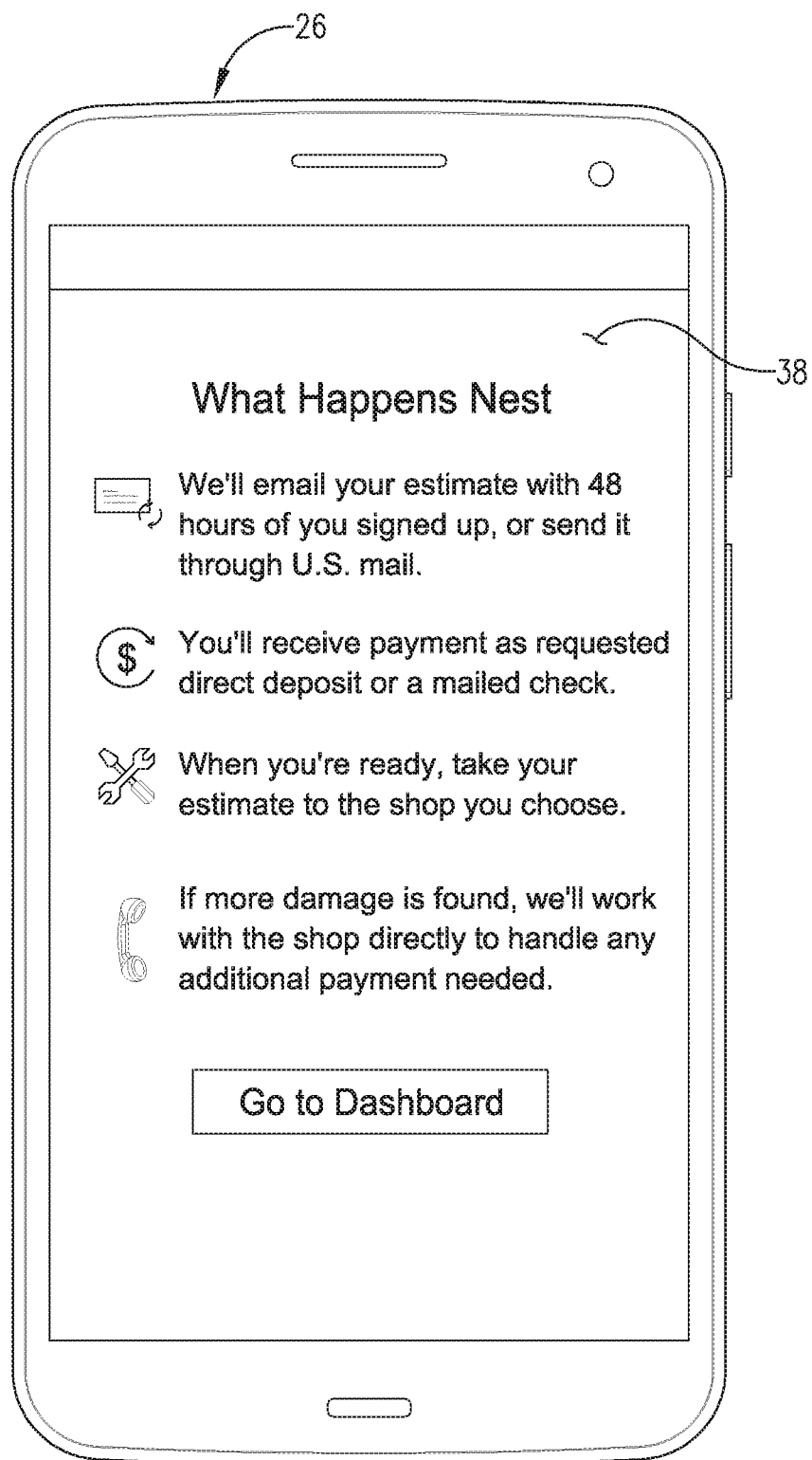
FIG. 18 is a depiction of an exemplary mobile device screen capture showing another information page indicating the next steps in the claim process.

As shown in FIG. 17, after the photos are submitted to the insurance provider through the mobile application 40, the user may be presented with a "Photos Submitted" screen on the display 38. The photos submitted screen may present the user with information regarding the timing of receiving an estimate from the insurance provider and/or contact information for the insurance provider. One or more clickable links may be included with the provided information, for example, to initiate a telephone call to the insurance provider and/or visit the insurance provider's website or physical location on a web-based map. In one embodiment, a "What Happens Next" icon 82 may be presented to the user. The user selects the "What Happens Next" icon 82 to be presented with additional information regarding the processing of his/her claim and/or request for an estimate, as is shown in FIG. 18.

Figure 19:
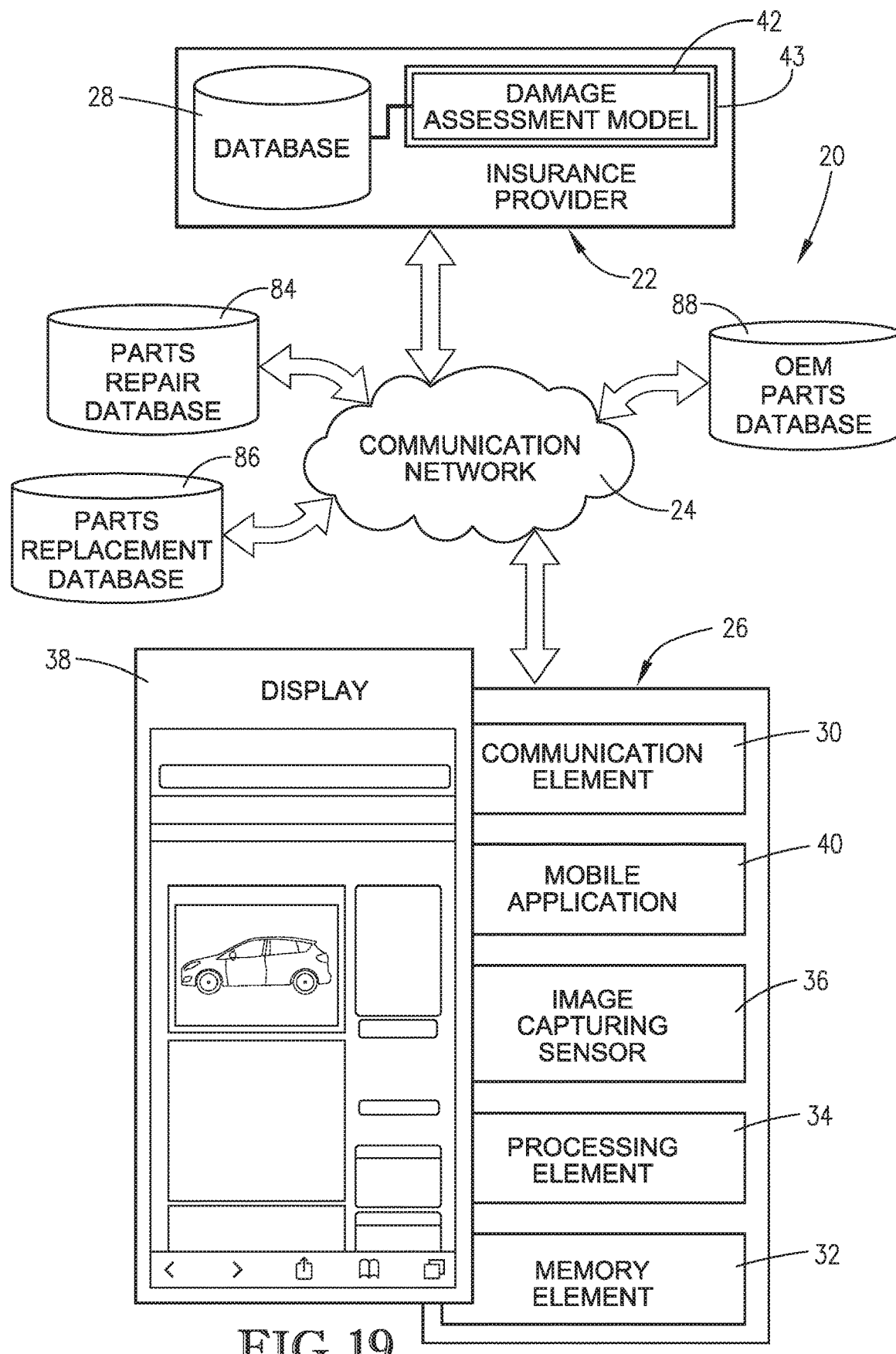
FIG. 19 is another exemplary computer system in which the methods shown in FIGS. 1-3 may operate.

FIG. 19 depicts an alternative computing environment for an embodiment of the mobile application configured to cooperate with the damage assessment model to allow the user of the mobile device quickly and easily obtain insurance claim information and/or open an insurance claim for vehicles based upon images captured by the mobile application of the insured property. In the alternative embodiment, the computer system 20 includes substantially the same components as described above with respect to FIG. 4 but may optionally include a parts repair database 84, a parts replacement database 86, and/or an OEM parts database 88.

The parts repair database 84 may include, for example, and without limitation, estimated repair cost data for one or more parts of a vehicle, such as time to repair data, materials required, and the like. The parts replacement database 86 may include, for example, and without limitation, replacement cost for one or more parts of a vehicle. In addition, the OEM parts database 88 may include information as to whether a selected part of a vehicle is available as an OEM part or a direct replacement aftermarket part.

In the illustrated embodiment, the parts repair database 84, the parts replacement database 86, and the OEM parts database 88 may be maintained by a third party, such as a vehicle repair facility, and connected to the insurance provider 22 via the communication network 24. Alternatively, the insurance provider 22 may maintain one or more of the parts repair database 84, the parts replacement database 86, and/or the OEM parts database 88.

Figure 20:
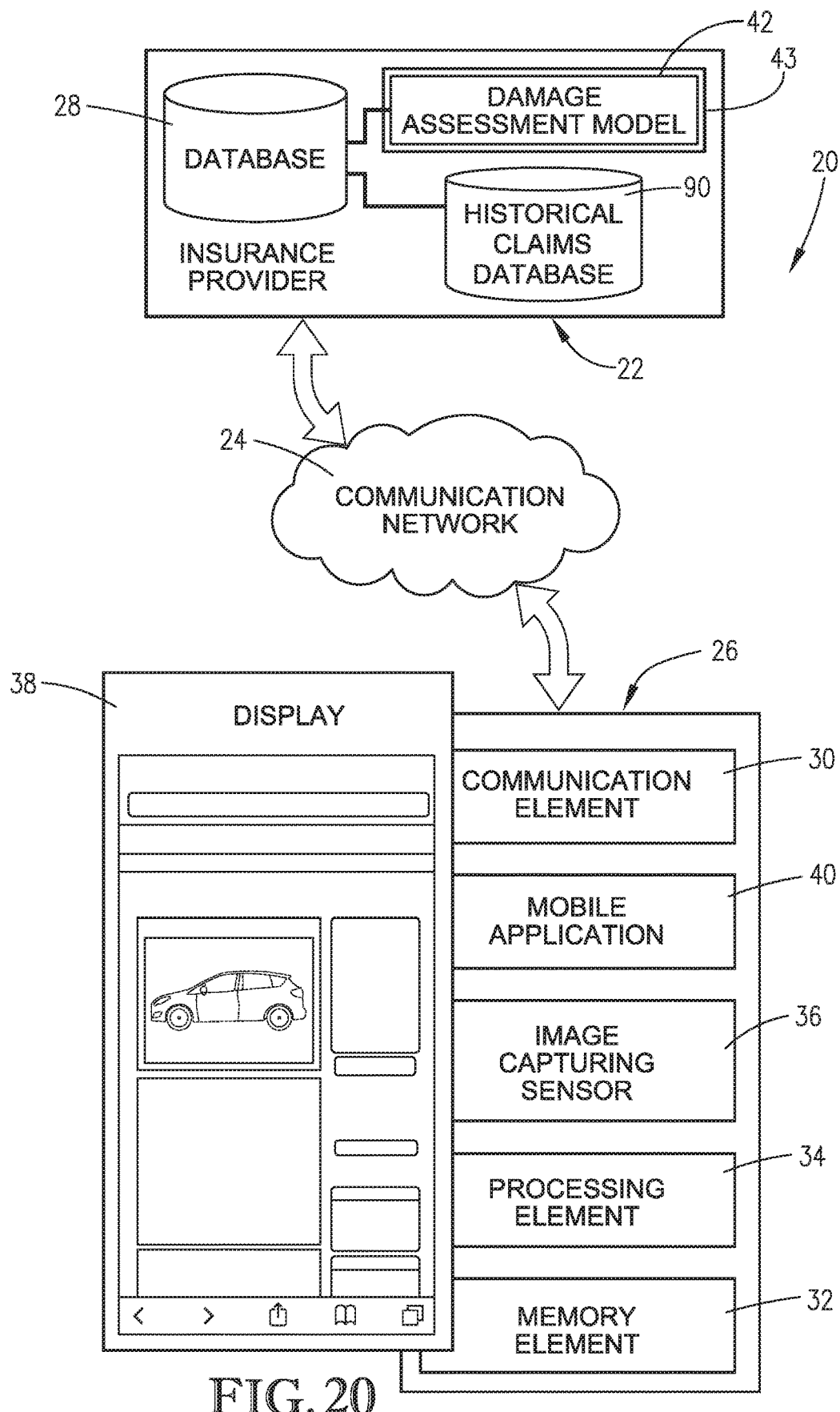
FIG. 20 is yet another exemplary computer system in which the methods shown in FIGS. 1-3 may operate.

In another alternative embodiment illustrated in FIG. 20, the insurance provider 22 may maintain a historical claims database 90 that includes, for example, and without limitation, a plurality of damaged vehicle images and corresponding repair cost data and repair time data. The images and corresponding data may have been collected by the insurance provider 22 over a period of time based on processed claims for customer vehicles.

Figure 21:
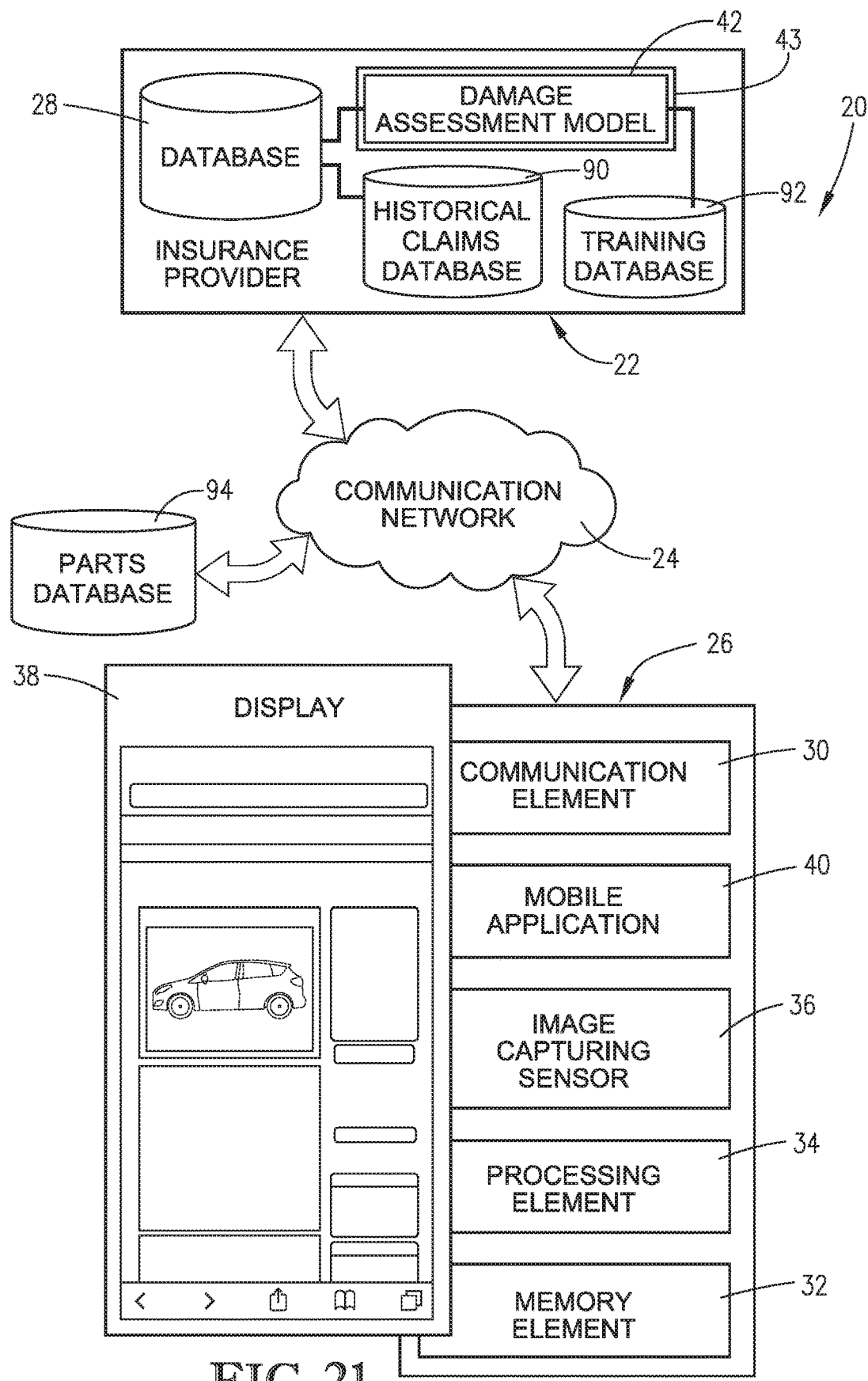
FIG. 21 is still another exemplary computer system in which the methods shown in FIGS. 1-3 may operate.

In another alternative embodiment shown in FIG. 21, the insurance provider 22 may maintain the historical claims database 90 that includes, for example, and without limitation, a plurality of damaged vehicle images and corresponding repair cost data and repair time data. In addition, the computer system 20 may include a training database 92 including a dataset of images of damaged vehicles used to train the damage assessment model 42. The images of damaged vehicles may be obtained, for example, from the historical claims database 90. In one suitable embodiment, the training database 92 may be a portion of or integral to the historical claims database 90. In addition, the computer system 20 may include a parts database 94 having data corresponding to a plurality of parts for vehicles. The parts database 94 may be maintained by a third-party or by the insurance provider 22 and may be coupled in communication to the communication network 24.

It is noted that the computer system 20 may include additional, fewer, or alternative components or features, including those discussed elsewhere herein, and particularly the additional features discussed in the section describing the computer-implemented method.

II. Exemplary Computer-Implemented Methods

Figure 22:
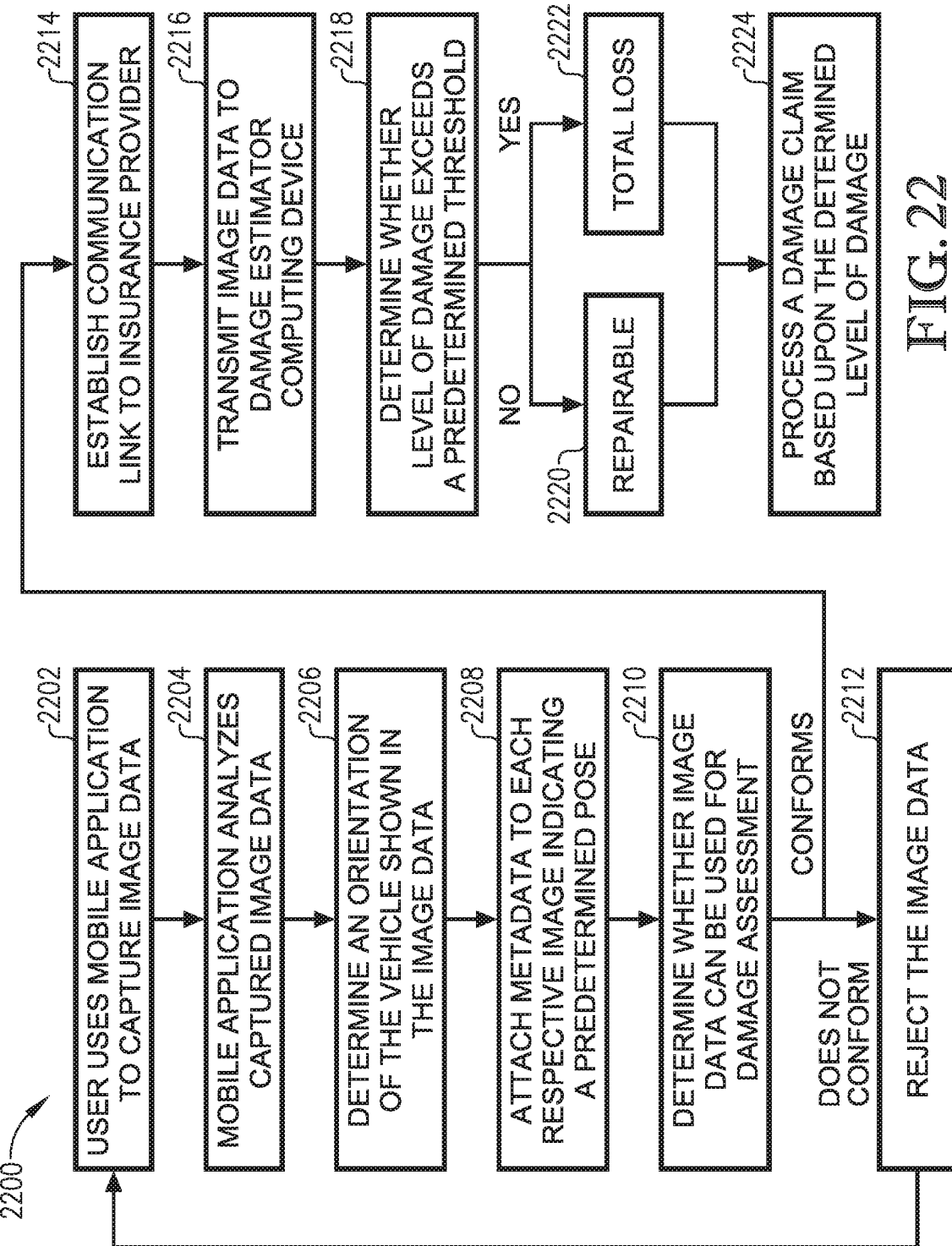
FIG. 22 is a flowchart of an exemplary computer-implemented method for facilitating a user of a mobile device obtaining image data of damage to a vehicle.

FIG. 22 shows an exemplary computer-implemented method 2200 for facilitating a user of a mobile device obtaining image data of damage to a vehicle for damage assessment performed by the mobile application 40. As discussed, the mobile application 40 may be stored in the memory element 32 and executed by the processing element 34 on the mobile device 26.

The user may launch the mobile application 40 and view on the display 38 a series of screens configured to guide the user in capturing the requested images of his/her vehicle. The user may use the mobile application 40 to capture a plurality of images, or image data, of his/her vehicle with the user's mobile device 26, which may be running the mobile application 40 or orientation model, as shown in step 2202. The user's vehicle for which the images are being captured may be substantially any kind of vehicle, such as a car, a truck, a motorcycle, a boat, an airplane, a personal watercraft, an all-terrain vehicle (ATV), a riding lawnmower, and/or a recreational vehicle. The image data captured by the mobile application may include, for example, vehicle information including one or more of a VIN, a make, a model, manufacturing year, a color, an engine, a condition, mileage or miles, and/or substantially any other information that enables the computer system 20 to function as described herein.

In one embodiment, the mobile application 40 may capture continuous video data of the user's vehicle and extract useable images from the captured video data. Alternatively, in one suitable embodiment, the mobile application 40 may capture single images of the vehicle in accordance with a requested pose of the user's vehicle. As described herein, the images and/or continuous video data may be captured by the image capturing sensor 36 of the mobile device 26.

In the exemplary embodiment, the mobile application 40 may analyze the captured image data at step 2204 and may determine an orientation of the vehicle shown in the captured images, as shown in step 2206. In analyzing the captured image data, the mobile application may implement a comparison process between the captured image data and historical image data contained in an orientation model database. In determining the orientation of the captured images, in one embodiment, the mobile application 40 may attach metadata to each respective image indicating a predetermined pose or label for the respective image, as shown at step 2208. The metadata may be used by the damage assessment model 42 to facilitate processing the captured images.

The mobile application 40 may determine whether the captured image data can be used for damage assessment by the damage assessment model 42, as shown in step 2210. If the captured images do not conform to the requested pose, such as poses 46 and 56 shown in FIGS. 6 and 8, respectively, then the mobile application 40 may reject the images, as shown in step 2212, and repeat the image capture process at step 2202. If the images are acceptable, the mobile application 40 may instruct the processing element 34 to establish, via the communication element 30, a communication link between the mobile device 26 and the insurance provider 22, and more precisely a damage estimator computing device 43 running the damage assessment model 42, as shown at step 2214. The mobile application 40 may transmit the image data to the damage estimator computing device 43, as shown in step 2216.

In one embodiment, the damage estimator computing device 43 may determine whether a level of damage to the vehicle shown in the image data exceeds a predetermined threshold, as shown in step 2218. That is, the damage estimator computing device 43 may classify the vehicle as repairable, as shown at step 2220, or whether to vehicle is not repairable and is a total loss, as shown at step 2222. In such an embodiment, the damage assessment model 42 may function as a classifier whose output is based one two or more classes, rather than a continuous value output as in regression techniques. The damage assessment model 42 may utilize any machine learning technique for the classifier, for example, and without limitation, logistic regression, decision tree, artificial neural network, support vector machines (SVM), and bagging.

In one suitable embodiment, the mobile application 40 may facilitate processing a damage claim based upon the determined level of damage (e.g., damage classification), as shown in step 2224. For example, if the vehicle is repairable, the mobile application 40 may facilitate processing a damage claim for repairing the user's vehicle. In addition, if the vehicle is determined to be a total loss, the mobile application 40 may facilitate processing a claim for total loss, as shown in step 2224.

Figure 23:
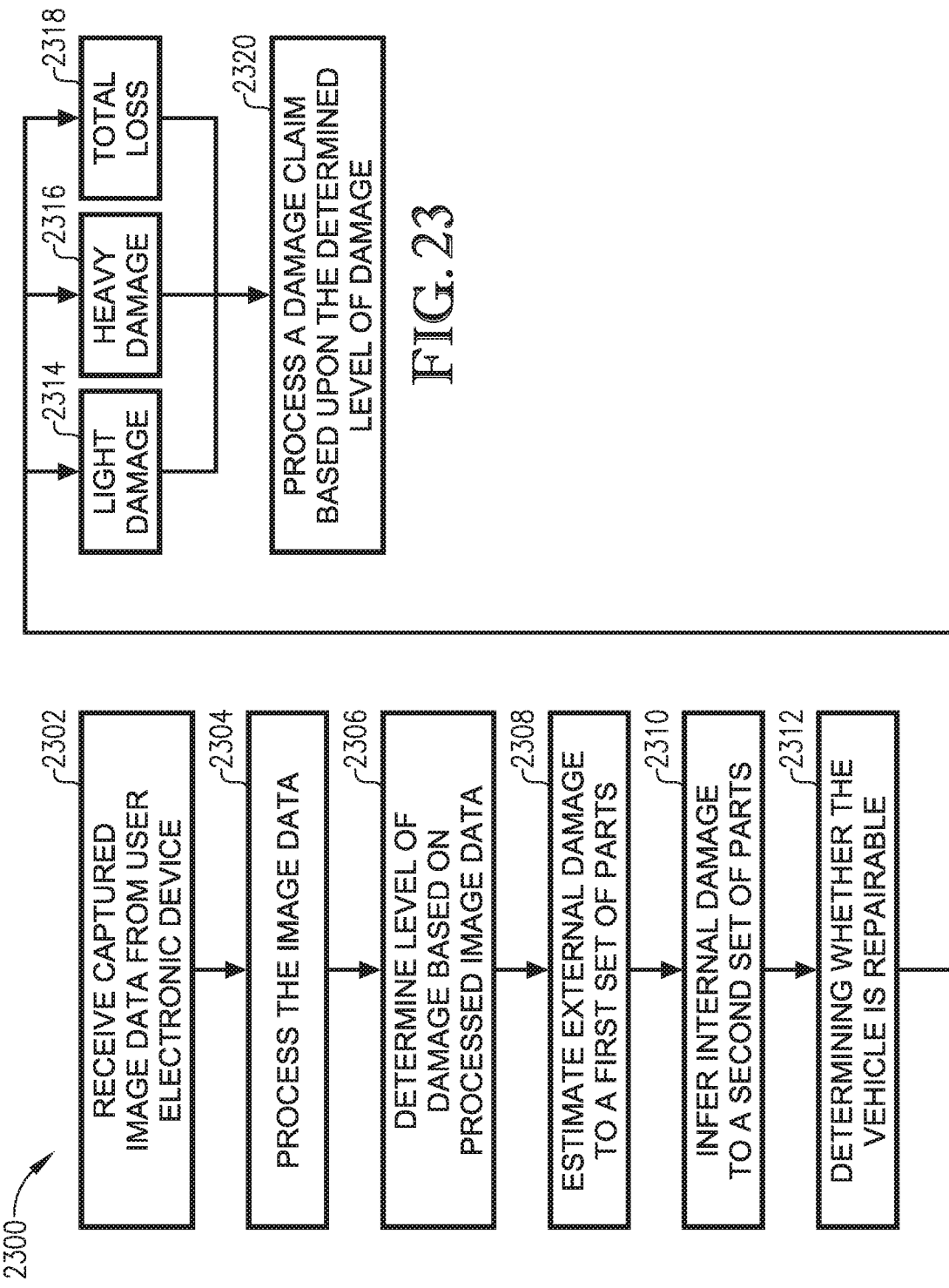
FIG. 23 is a flowchart of an exemplary computer-implemented method for vehicle damage assessment.

FIG. 23 shows another exemplary computer-implemented method 2300 for vehicle damage assessment performed by the damage estimator computing device 43. As discussed, the damage estimator computing device 43 may store and run the damage assessment model 42.

In the exemplary embodiment, the damage estimator computing device 43 may receive captured image data of a vehicle from a user electronic device, such as the mobile device 26, as shown in step 2302. The mobile device 26 may include, for example, the mobile application 40, or orientation model, which is configured to assist the user with the image capture.

The damage estimator computing device 43 may process the image data, as shown in step 2304. In one implementation, the damage estimator computing device 43 may process the image data using the damage assessment model 42. The damage assessment model 42 may include, for example, and without limitation, a machine learning program trained to identify damage of the vehicle, as is discussed herein.

At step 2306, the damage estimator computing device 43 may determine a level of damage to the vehicle based on the processed image data. For example, and without limitation, the damage estimator computing device 43 may estimate external damage to a first set of parts of the vehicle, as shown at step 2308, and infer internal damage to a second set of parts, as shown at step 2310, based on the processed image data. In such an implementation, determining the level of damage to the vehicle includes determining whether the vehicle is repairable, as shown at step 2312.

In one implementation, the damage estimator computing device 43 may determine whether the damage is light damage below a first threshold damage level, as shown in step 2314, whether the damage is heavy damage above the first threshold and below a second threshold, as shown in step 2316, or whether the damage is a total loss above the second threshold, as shown instep 2318. After determining the level of damage to the vehicle, the damage estimator computing device 43 may process a damage claim based upon the determined level of damage, as shown in step 2320.

Figure 24:
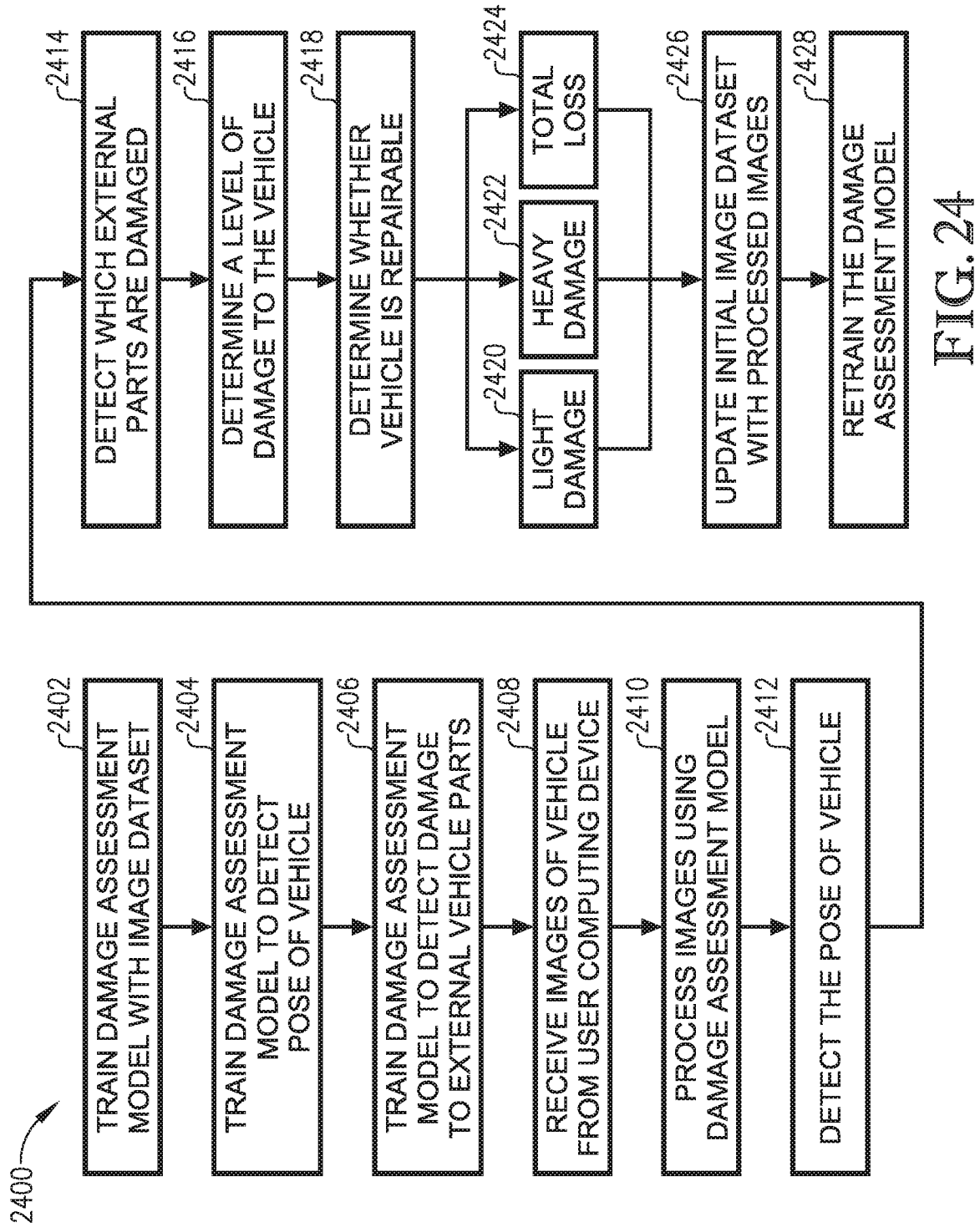
FIG. 24 is a flowchart of an exemplary computer-implemented method for determining a level of damage of a vehicle.

FIG. 24 shows another exemplary computer-implemented method 2400 for determining a level of damage of a vehicle performed by the damage estimator computing device 43. In the exemplary embodiment, the damage estimator computing device 43 may train the damage assessment model 42, as shown in step 2402, using an initial image dataset of damaged vehicles contained, for example, in the training database 92. As described, the training database 92 may be part of the historical claims database 90 or may be a separate training database. The damage estimator computing device 43 may further train the damage assessment model 43 to detect a pose of the vehicle, as shown in step 2404, and to detect damage to a plurality of external vehicle parts, as shown in step 2406.

The damage estimator computing device 43 may receive one or more images of a vehicle from a user computing device, such as the mobile device 26, as shown in step 2408. In step 2410, the damage estimator computing device 43 may process each of the one or more images, using the damage assessment model 42. In one embodiment, the damage estimator computing device 43 may detect the pose of the vehicle, as shown in step 2412. In another embodiment, the damage estimator computing device 43 may detect which external parts of the vehicle are damaged in each of the images, as shown in step 2414.

In the exemplary embodiment, the damage estimator computing device 43 may then determine a level of damage to the vehicle based on the processed one or more images, as shown in step 2416. For example, and without limitation, the damage estimator computing device 43 may determine whether the vehicle is repairable, as shown at step 2418.

In one embodiment, the damage estimator computing device 43 may determine whether the damage is light damage below a first threshold damage level, as shown in step 2420, whether the damage is heavy damage above the first threshold and below a second threshold, as shown in step 2422, or whether the damage is a total loss above the second threshold, as shown instep 2424.

In another embodiment, the damage estimator computing device 43 may update the initial image dataset of damaged vehicles with the processed one or more images, as shown in step 2426. This may facilitate continuous learning of the damage assessment model 43. At step 2428, the damage estimator computing device 43 may retrain the damage assessment model 43 with the updated initial image dataset.

Figure 25:
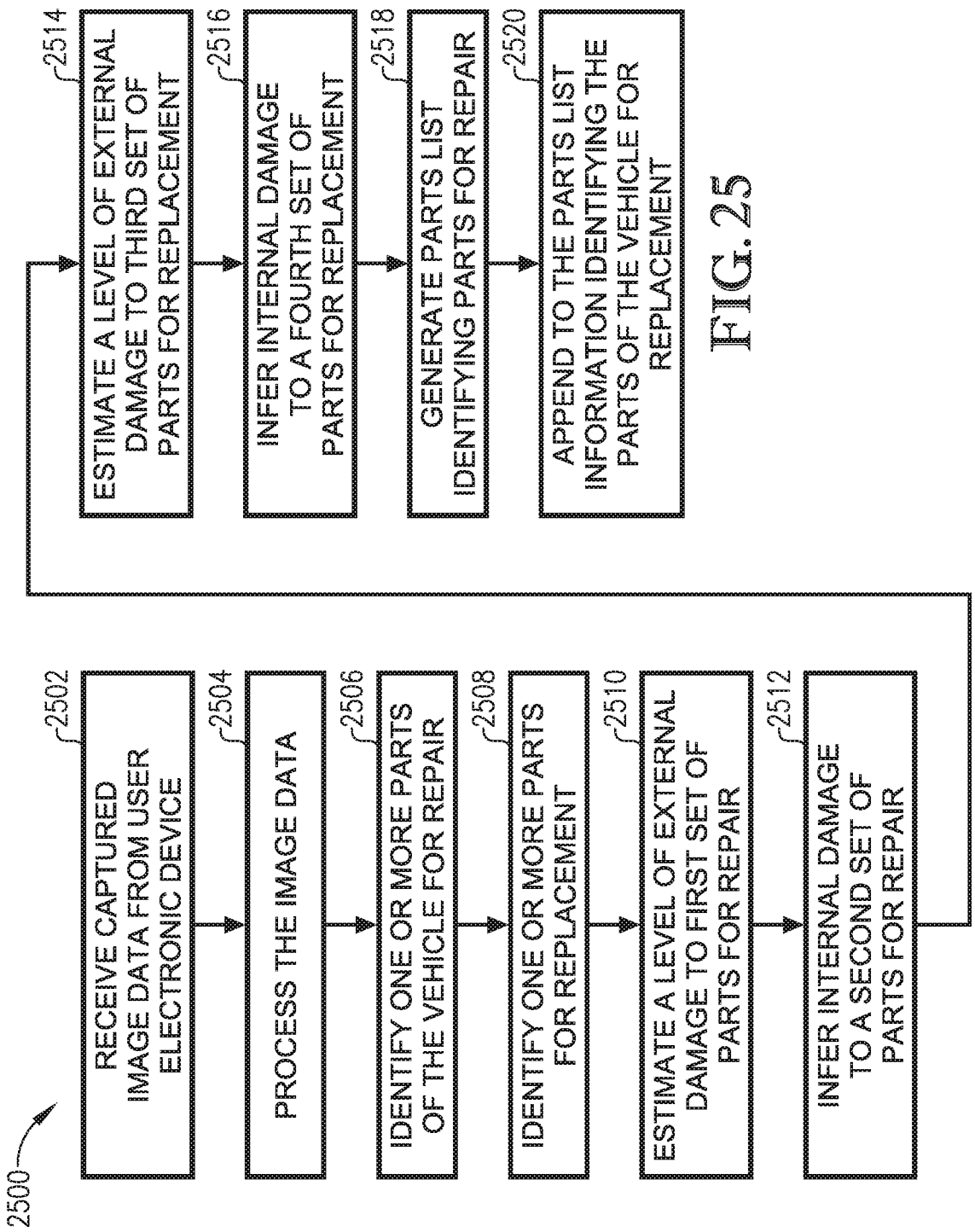
FIG. 25 is a flowchart of an exemplary computer-implemented method for identification of damaged items needing repair.

FIG. 25 shows another exemplary computer-implemented method 2500 for identification of damaged items needing repair performed by the damage estimator computing device 43. In the exemplary embodiment, the damage estimator computing device 43 may receive image data of a vehicle from a user mobile device, such as the mobile device 26, as shown in step 2502.

In step 2504, the damage estimator computing device 43 may process the image data using the damage assessment model 42 to determine whether one or more parts of the vehicle are damaged. As described, the damage assessment model may include a machine learning program trained to identify damage to the vehicle.

In one embodiment, the damage estimator computing device 43 may identify one or more parts of the vehicle for repair, as shown in step 2506. In addition, the damage estimator computing device 43 may identify one or more parts of the vehicle for replacement, as shown in step 2508.

The damage estimator computing device 43 may estimate a level of external damage to a first set of parts of the vehicle for repair at step 2510, wherein the estimated level of external damage is below a predetermined threshold. At step 2512, the damage estimator computing device 43 may infer a level of internal damage to a second set of parts of the vehicle for repair, wherein the inferred level of internal damage is below the predetermined threshold.

Moreover, the damage estimator computing device 43 may estimate a level of external damage to a third set of parts of the vehicle for replacement at step 2514, wherein the estimated level of external damage exceeds the predetermined threshold. At step 2516, the damage estimator computing device 43 may infer a level of internal damage to a fourth set of parts of the vehicle for replacement, wherein the inferred level of internal damage exceeds the predetermined threshold.

Furthermore, at step 2518, the damage estimator computing device 43 may generate a parts list identifying the parts of the vehicle for repair, and at step 2520, the damage estimator computing device 43 may append to the parts list information identifying the parts of the vehicle for replacement. The damage estimator computing device 43 may include information in the parts list indicating whether the parts for replacement are available as OEM parts or aftermarket parts after accessing, for example, the OEM parts database 88.

Figure 26:
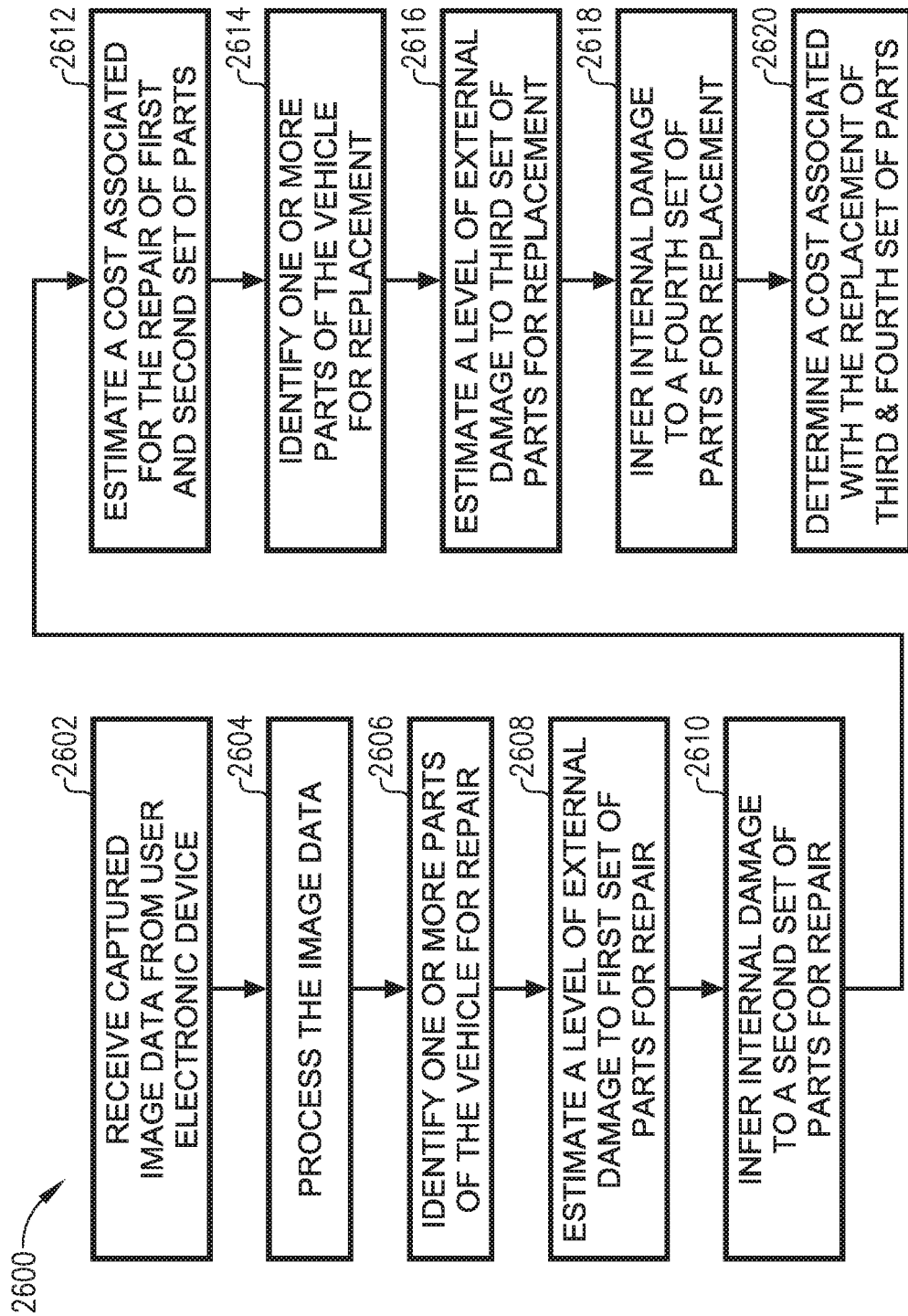
FIG. 26 is a flowchart of an exemplary computer-implemented method for processing images of a damaged vehicle and estimating a repair cost of the damaged vehicle.

FIG. 26 shows another exemplary computer-implemented method 2600 for processing images of a damaged vehicle and estimating a repair cost of the damaged vehicle performed by the damage estimator computing device 43. In the exemplary embodiment, the damage estimator computing device 43 may receive image data of the vehicle from a user mobile device, such as the mobile device 26, as shown in step 2602.

In step 2604, the damage estimator computing device 43 may process the image data using the damage assessment model 42 to determine whether one or more parts of the vehicle are damaged. As described, the damage assessment model may include a machine learning program trained to identify damage to the vehicle.

In one embodiment, the damage estimator computing device 43 may identify one or more parts of the vehicle for repair, as shown in step 2606. The damage estimator computing device 43 may estimate a level of external damage to a first set of parts of the vehicle for repair at step 2608, wherein the estimated level of external damage is below a predetermined threshold. At step 2610, the damage estimator computing device 43 may infer a level of internal damage to a second set of parts of the vehicle for repair, wherein the inferred level of internal damage is below the predetermined threshold.

The damage estimator computing device 43 may also estimate a cost associated for the repair of each of the parts of the damaged vehicle identified for repair based on estimated repair cost data contained in the parts repair database 84, as shown in step 2612. As described, the parts repair database 84 may include, for example, and without limitation, estimated repair cost data for one or more parts of a vehicle, such as time to repair data, materials required, and the like. The parts repair database 84 may be maintained by a third party, such as a vehicle repair facility, and connected to the insurance provider 22 via the communication network 24 or may be maintained by the insurance provider 22.

In addition, in one embodiment, the damage estimator computing device 43 may identify one or more parts of the vehicle for replacement, as shown in step 2614. The damage estimator computing device 43 may estimate a level of external damage to a third set of parts of the vehicle for replacement at step 2616, wherein the estimated level of external damage exceeds the predetermined threshold. At step 2618, the damage estimator computing device 43 may infer a level of internal damage to a fourth set of parts of the vehicle for replacement, wherein the inferred level of internal damage exceeds the predetermined threshold.

The damage estimator computing device 43 may also determine a cost associated with the replacement of each of the parts of the damaged vehicle for replacement based on replacement cost data contained in a parts replacement database 86, as shown in step 2620. As described, the parts replacement database 86 may include, for example, and without limitation, replacement cost for one or more parts of a vehicle. The parts replacement database 86 may be maintained by a third party, such as a vehicle repair facility, and connected to the insurance provider 22 via the communication network 24 or may be maintained by the insurance provider 22.

Figure 27:
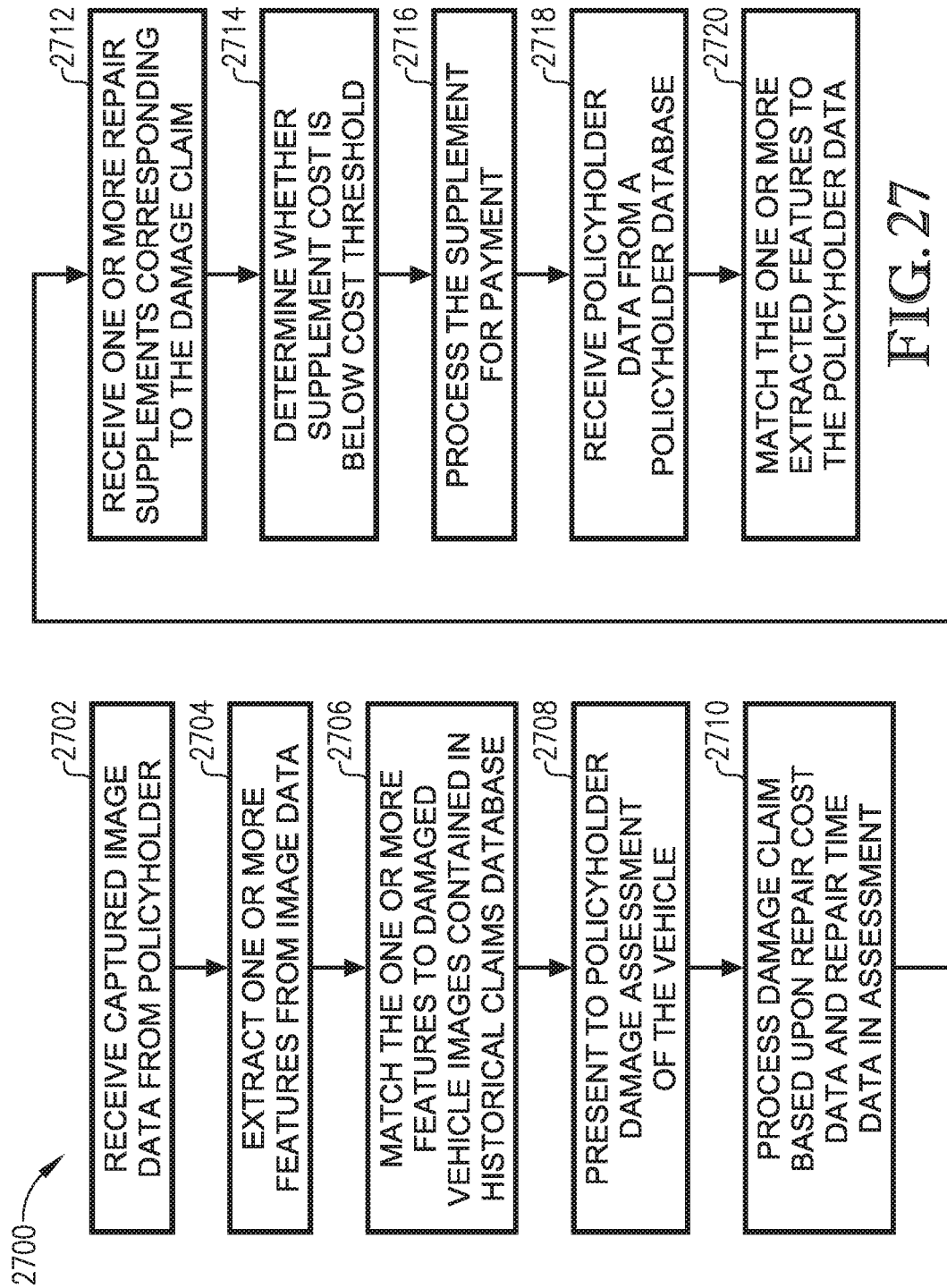
FIG. 27 is a flowchart of an exemplary computer-implemented method for processing one or more images of a vehicle and providing a damage assessment of the vehicle to a policyholder.

FIG. 27 shows another exemplary computer-implemented method 2700 for processing one or more images of a vehicle and providing a damage assessment of the vehicle to a policyholder performed by the damage estimator computing device 43. In the exemplary embodiment, the damage estimator computing device 43 may receive one or more images of the vehicle from the policyholder, for example, via the mobile device 26, as shown in step 2702.

At step 2704, the damage estimator computing device 43 may extract one or more features from the images of the vehicle. The one or more features may include, for example, large features such as a general shape of the vehicle, relative locations of the wheel top selected body parts, headlight or taillight size and shapes, and the like.

At step 2706, the damage estimator computing device 43 may match the one or more features to one or more damaged vehicle images contained in the historical claims database 90. As described, the historical claims database 90 may include, for example, a plurality of damaged vehicle images and corresponding repair cost data and repair time data. The historical claims database is typically maintained by the insurance provider 22, but in some embodiments, may be maintained by a third-party on a contractual basis.

At step 2708, the damage estimator computing device 43 may present to the policyholder a damage assessment of the vehicle. The damage assessment may include, for example, the repair cost data and repair time data corresponding to the matched one or more damaged vehicle images from the historical claims database 90.

In one embodiment, the damage estimator computing device 43 may process a damage claim based upon the repair cost data and repair time data corresponding to the matched one or more damaged vehicle images, as shown at step 2710.

In another embodiment, the damage estimator computing device 43 may receive one or more repair supplements corresponding to the damage claim, as shown at step 2712. For example, a vehicle repair facility may submit a supplement to the insurance provider 22 indicating that additional parts and or work may be required to complete the vehicle repair and may include a total cost to complete the repair. At step 2714, the damage estimator computing device 43 may determine whether the supplement cost combined with the repair cost data and repair time data corresponding to the matched damaged vehicle images is below a predefined cost threshold for the damage claim. The damage estimator computing device 43 may process the supplement for payment if the supplement cost combined with the repair cost data and repair time data is below the predefined cost threshold, as shown at step 2716.

In one suitable embodiment, the damage estimator computing device 43 may receive policyholder data from a policyholder database, such as the database 28, as shown in step 2718. As described, the insurance provider 22 may maintain the database 28 of customer (i.e., policyholder) information, which may include such information as each customer's name, age, address, driving history, insurance history, number and type of vehicles insured, vehicle VINs, and/or number of miles each vehicle is driven in a particular time period (e.g., per year, per six months, etc.). At step 2720, the damage estimator computing device 43 may match the one or more extracted features to the policyholder data. For example, one of the extracted features may include a vehicle VIN. The damage estimator computing device 43 may match the VIN to the policyholder data to facilitate verifying the correct insurance policy for initiating a damage claim.

Figure 28:
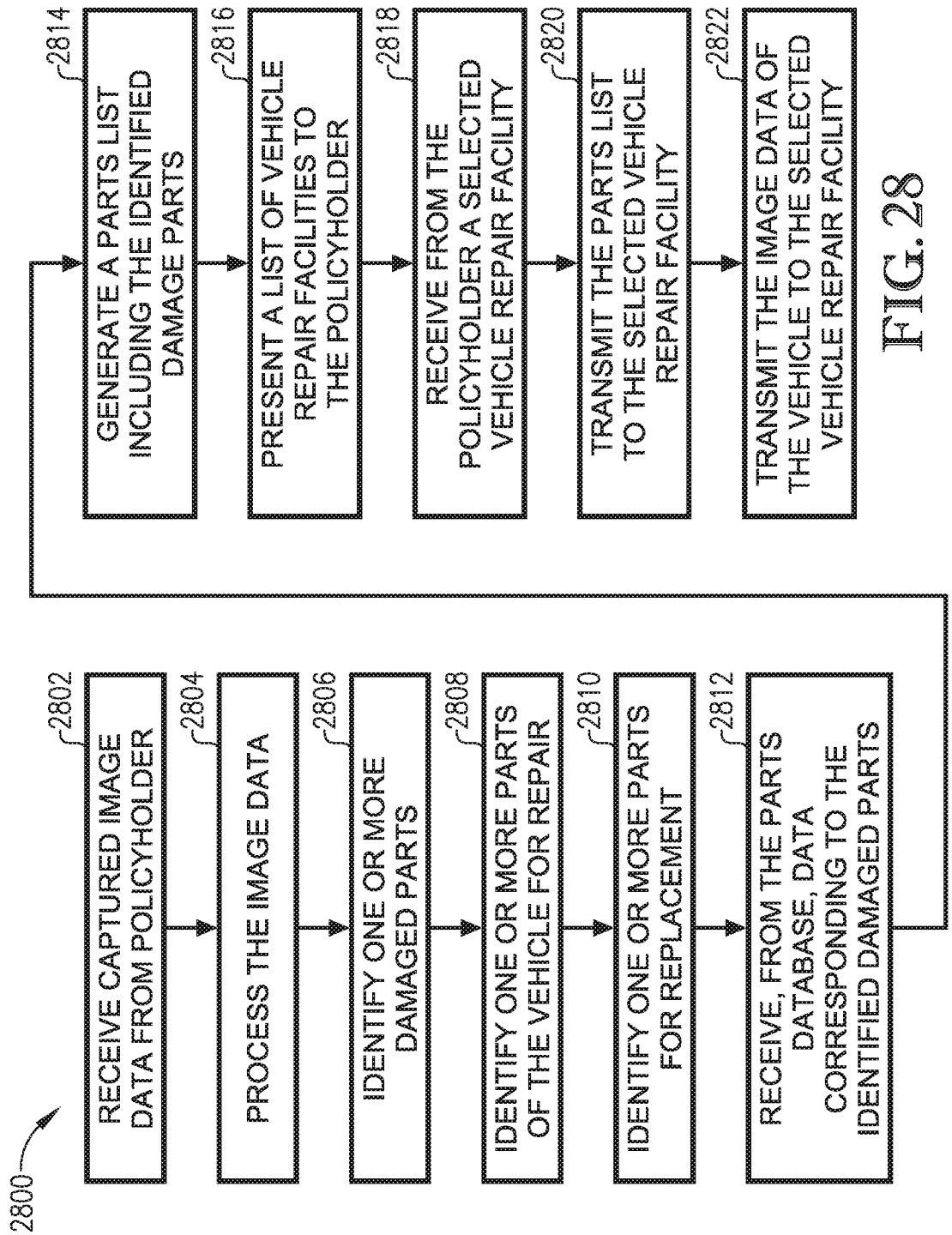
FIG. 28 is a flowchart of an exemplary computer-implemented method for processing image data of a vehicle to identify one or more damaged parts.

FIG. 28 shows another exemplary computer-implemented method 2800 for processing image data of a vehicle to identify one or more damaged parts performed by the damage estimator computing device 43. In the exemplary embodiment, the damage estimator computing device 43 may receive image data of the vehicle from the policyholder, for example, via the mobile device 26, as shown in step 2802.

The damage estimator computing device 43 may process the image data to determine whether the image data includes images of one or more damaged parts of the vehicle, as shown in step 2804. At step 2806, the damage estimator computing device 43 may identify the one or more damaged parts. In one embodiment, the damage estimator computing device 43 may identify one or more parts of the vehicle for repair, as shown in step 2808. In addition, the damage estimator computing device 43 may identify one or more parts of the vehicle for replacement, as shown in step 2810.

The damage estimator computing device 43 may receive, for example, from the parts database 94, data corresponding to the identified damaged parts, as shown in step 2812. Moreover, the damage estimator computing device 43 may generate a parts list including the identified damaged parts and the data corresponding to the identified damaged parts, as shown at step 2814. In some embodiments, the parts list may include identifying the damaged parts for repair and the damaged parts for replacement, and whether the replacement parts are OEM parts or aftermarket parts.

In one embodiment, the damage estimator computing device 43 may present a list of vehicle repair facilities to the policyholder, as shown in step 2816. In addition, the damage estimator computing device 43 may receive from the policyholder a selected vehicle repair facility selected from the list of vehicle repair facilities, as shown in step 2818. The damage estimator computing device 43 may transmit the parts list to the selected vehicle repair facility at step 2820. In addition, at step 2822, the damage estimator computing device 43 may also transmit the image data of the vehicle to the selected vehicle repair facility.

Figure 29:
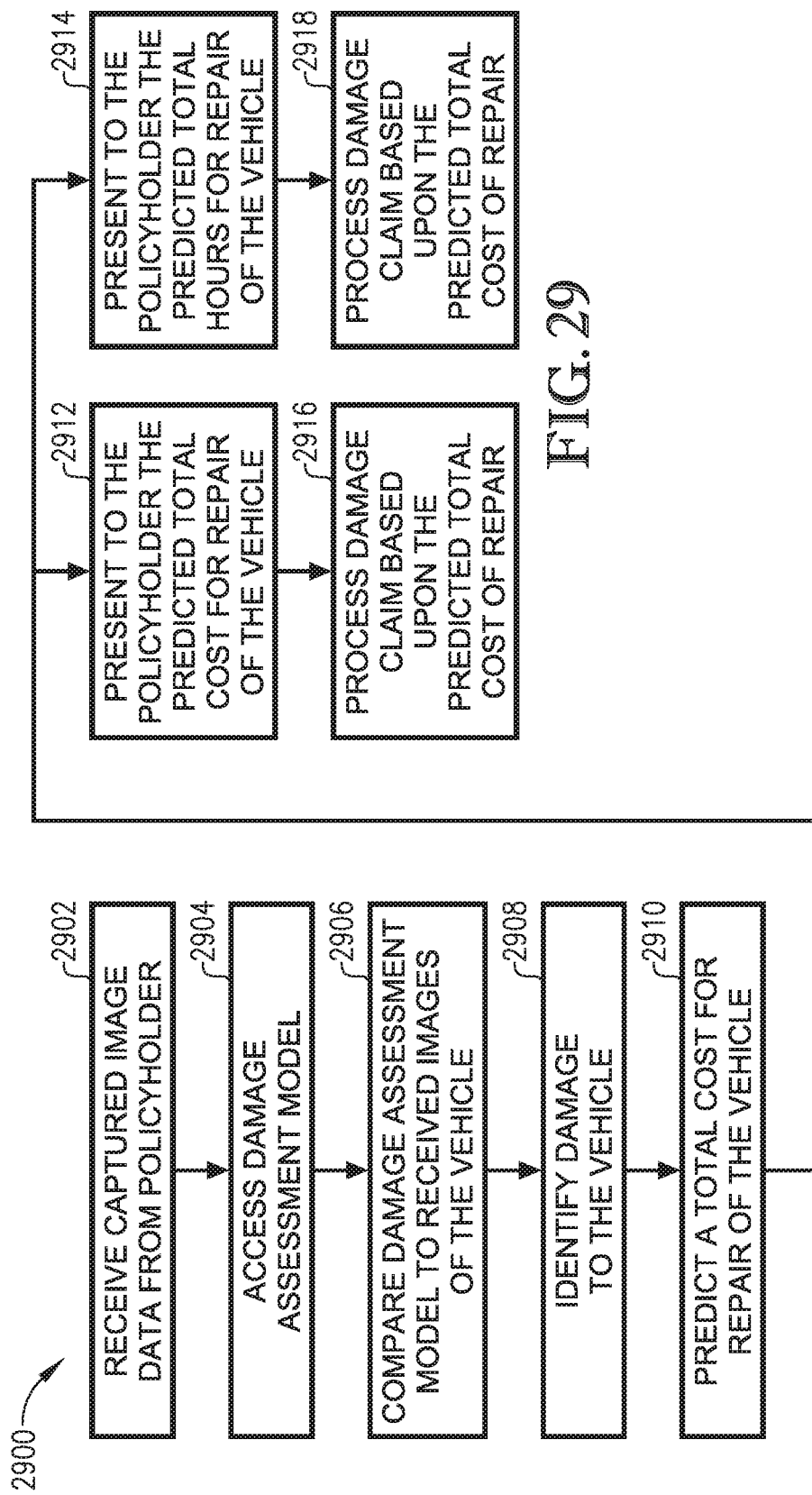
FIG. 29 is a flowchart of an exemplary computer-implemented method for predicting the repair cost of a vehicle.

FIG. 29 shows another exemplary computer-implemented method 2900 for predicting the repair cost of a vehicle performed by the damage estimator computing device 43. In the exemplary embodiment, the damage estimator computing device 43 may receive images of the vehicle from a policyholder, for example, via the mobile device 26, as shown in step 2902.

The damage estimator computing device 43 may access the damage assessment model 42, as shown at step 2904. As described, the damage assessment model 42 may be associated with features of vehicle damage based on a plurality of damaged vehicle images contained in the image training database 92. The damage estimator computing device 43 may compare the damage assessment model 42 to the received images of the vehicle, as shown at step 2906. In one embodiment, the damage assessment model may perform a regression operation on the images, and more particularly, a linear regression operation. The regression operation may, for example, predict a continuous quantity output, rather than predicting a discrete class label as with a classifier operation.

At step 2908, the damage estimator computing device 43 may identify damage to the vehicle based on the received images of the vehicle and using the damage assessment model 42. In response to identifying the vehicle damage, the damage estimator computing device 43 may predict a total cost for repair of the vehicle, as shown in step 2910. The predicted total cost of repair may be based on associated total cost for repair data contained in the historical claims database 90, and total hours for repair of the vehicle based on associated total hours for repair data contained in the historical claims database 90.

In one embodiment, the damage estimator computing device 43 may present to the policyholder the predicted total cost for repair of the vehicle, as shown in step 2912. In another embodiment, the damage estimator computing device 43 may present to the policyholder the predicted total hours for repair of the vehicle, as shown in step 2914.

Furthermore, in some suitable embodiments, the damage estimator computing device 43 may process a damage claim based upon the predicted total cost of repair of the vehicle, as shown in steps 2916 and 2918.

Figure 30:
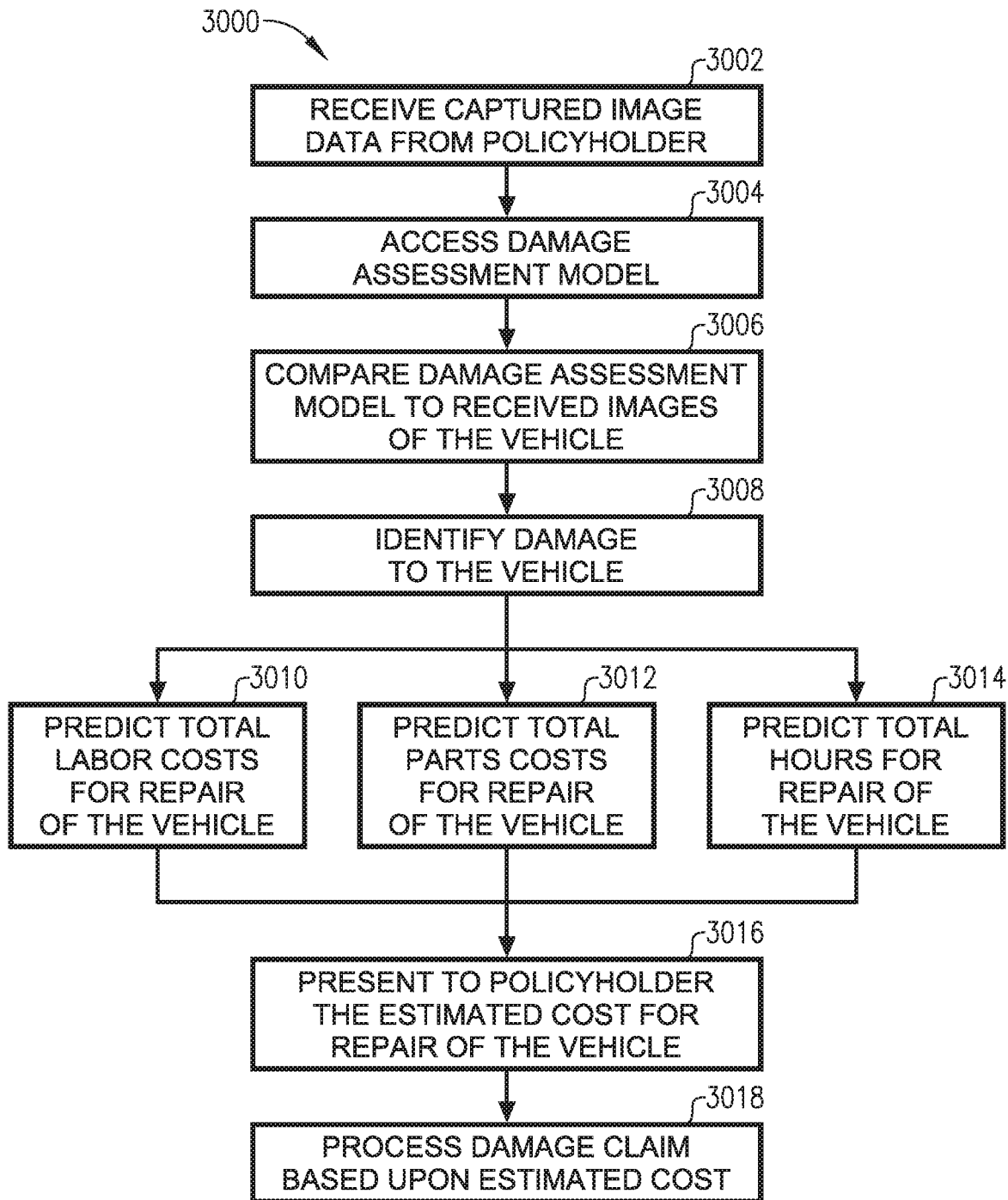
FIG. 30 is a flowchart of another exemplary computer-implemented method for predicting the repair cost of a vehicle.

FIG. 30 shows another exemplary computer-implemented method 3000 for predicting the repair cost of a vehicle performed by the damage estimator computing device 43. In the exemplary embodiment, the damage estimator computing device 43 may receive images of the vehicle from a policyholder, for example, via the mobile device 26, as shown in step 3002.

The damage estimator computing device 43 may access the damage assessment model 42, as shown at step 3004. As described, the damage assessment model 42 may be associated with features of vehicle damage based on a plurality of damaged vehicle images contained in the image training database 92. The damage estimator computing device 43 may compare the damage assessment model 42 to the received images of the vehicle, as shown at step 3006. In one embodiment, the damage assessment model may perform a regression operation on the images, and more particularly, a linear regression operation.

At step 3008, the damage estimator computing device 43 may identify damage to the vehicle based on the received images of the vehicle and using the damage assessment model 42. In response to identifying the vehicle damage, the damage estimator computing device 43 may predict total labor costs, total parts costs, and total hours for repair of the vehicle based, as shown in steps 3010, 3012, and 3014, respectively. The predicted costs may be based on the associated total labor costs, total parts costs, and total hours for repair data contained in the historical claims database 90.

In one embodiment, the damage estimator computing device 43 may present to the policyholder an estimated cost for repair of the vehicle, as shown in step 3016. The estimate may include, for example, the predicted total labor costs, total parts costs, and total hours for repair of the vehicle. Furthermore, in some suitable embodiments, the damage estimator computing device 43 may process a damage claim based upon the estimated cost of repair of the vehicle, as shown in step 3018.

The various embodiments of the computer-implemented methods may include additional, fewer, or alternative features, including those discussed elsewhere herein.

III. Exemplary Computer-Readable Media

Referring again to FIG. 22, a non-transitory computer-readable storage media with computer-executable instructions stored thereon may be provided for facilitating a user of a mobile device, such as the mobile device 26, obtaining image data of damage to a vehicle for damage assessment performed by the mobile application 40. As discussed, the mobile application 40 may be stored in the memory element 32 and executed by the processing element 34 on the mobile device 26. The user may launch the mobile application 40 and view on the display 38 a series of screens configured to guide the user in capturing the requested images of his/her vehicle. The user may use the mobile application 40 to capture a plurality of images, or image data, of his/her vehicle with the user's mobile device 26, which may be running the mobile application 40 or orientation model, as shown in step 2202. The mobile application 40 may analyze the captured image data at step 2204 and may determine an orientation of the vehicle shown in the captured images, as shown in step 2206. The mobile application 40 may determine whether the captured image data can be used for damage assessment by the damage assessment model 42, as shown in step 2210. Additionally, the mobile application 40 may transmit the image data to the damage estimator computing device 43, as shown in step 2216.

Referring once more to FIG. 23, a non-transitory computer-readable storage media with computer-executable instructions stored thereon may be provided for vehicle damage assessment performed by the damage estimator computing device 43. The damage estimator computing device 43 may receive captured image data of a vehicle from a user electronic device, such as the mobile device 26, as shown in step 2302. The damage estimator computing device 43 may process of the image data, as shown in step 2304. Moreover, the damage estimator computing device 43 may determine a level of damage to the vehicle based on the processed image data.

Referring again to FIG. 24, a non-transitory computer-readable storage media with computer-executable instructions stored thereon may be provided for determining a level of damage of a vehicle performed by the damage estimator computing device 43. The damage estimator computing device 43 may train the damage assessment model 42, as shown in step 2402, using an initial image dataset of damaged vehicles contained, for example, in the training database 92. The damage estimator computing device 43 may receive one or more images of a vehicle from a user computing device, such as the mobile device 26, as shown in step 2408. In step 2410, the damage estimator computing device 43 may process each of the one or more images, using the damage assessment model 42. In the exemplary embodiment, the damage estimator computing device 43 may then determine a level of damage to the vehicle based on the processed one or more images, as shown in step 2416.

With reference back to FIG. 25, a non-transitory computer-readable storage media with computer-executable instructions stored thereon may be provided for identification of damaged items needing repair performed by the damage estimator computing device 43. The damage estimator computing device 43 may receive image data of a vehicle from a user mobile device, such as the mobile device 26, as shown in step 2502. In step 2504, the damage estimator computing device 43 may process the image data using the damage assessment model 42 to determine whether one or more parts of the vehicle are damaged. The damage estimator computing device 43 may identify one or more parts of the vehicle for repair, as shown in step 2506. In addition, the damage estimator computing device 43 may identify one or more parts of the vehicle for replacement, as shown in step 2508.

Referring again to FIG. 26, a non-transitory computer-readable storage media with computer-executable instructions stored thereon may be provided for processing images of a damaged vehicle and estimating a repair cost of the damaged vehicle performed by the damage estimator computing device 43. The damage estimator computing device 43 may receive image data of the vehicle from a user mobile device, such as the mobile device 26, as shown in step 2602. The damage estimator computing device 43 may process the image data using the damage assessment model 42 to determine whether one or more parts of the vehicle are damaged. The damage estimator computing device 43 may identify one or more parts of the vehicle for repair, as shown in step 2606. The damage estimator computing device 43 may also estimate a cost associated for the repair of each of the parts of the damaged vehicle identified for repair based on estimated repair cost data contained in the parts repair database 84, as shown in step 2612. In addition, the damage estimator computing device 43 may identify one or more parts of the vehicle for replacement, as shown in step 2614, and may also determine a cost associated with the replacement of each of the parts of the damaged vehicle for replacement based on replacement cost data contained in a parts replacement database 86, as shown in step 2620.

With reference once more to FIG. 27, a non-transitory computer-readable storage media with computer-executable instructions stored thereon may be provided for processing one or more images of a vehicle and providing a damage assessment of the vehicle to a policyholder performed by the damage estimator computing device 43. The damage estimator computing device 43 may receive one or more images of the vehicle from the policyholder, for example, via the mobile device 26, as shown in step 2702. The damage estimator computing device 43 may extract one or more features from the images of the vehicle and may match the one or more features to one or more damaged vehicle images contained in the historical claims database 90. Moreover, the damage estimator computing device 43 may present to the policyholder a damage assessment of the vehicle.

Referring again to FIG. 28, a non-transitory computer-readable storage media with computer-executable instructions stored thereon may be provided for processing image data of a vehicle to identify one or more damaged parts performed by the damage estimator computing device 43. The damage estimator computing device 43 may receive image data of the vehicle from the policyholder, for example, via the mobile device 26, as shown in step 2802. The damage estimator computing device 43 may process the image data to determine whether the image data includes images of one or more damaged parts of the vehicle, as shown in step 2804. In addition, the damage estimator computing device 43 may identify the one or more damaged parts. The damage estimator computing device 43 may receive, for example, from the parts database 94, data corresponding to the identified damaged parts, as shown in step 2812. Moreover, the damage estimator computing device 43 may generate a parts list including the identified damaged parts and the data corresponding to the identified damaged parts, as shown at step 2814.

Referring one more to FIG. 29, a non-transitory computer-readable storage media with computer-executable instructions stored thereon may be provided for predicting the repair cost of a vehicle performed by the damage estimator computing device 43. The damage estimator computing device 43 may receive images of the vehicle from a policyholder, for example, via the mobile device 26, as shown in step 2902. The damage estimator computing device 43 may access the damage assessment model 42, as shown at step 2904. The damage estimator computing device 43 may compare the damage assessment model 42 to the received images of the vehicle, as shown at step 2906. At step 2908, the damage estimator computing device 43 may identify damage to the vehicle based on the received images of the vehicle and using the damage assessment model 42. In response to identifying the vehicle damage, the damage estimator computing device 43 may predict a total cost for repair of the vehicle, as shown in step 2910.

With reference again to FIG. 30, a non-transitory computer-readable storage media with computer-executable instructions stored thereon may be provided for predicting the repair cost of a vehicle performed by the damage estimator computing device 43. The damage estimator computing device 43 may receive images of the vehicle from a policyholder, for example, via the mobile device 26, as shown in step 3002. The damage estimator computing device 43 may access the damage assessment model 42, as shown at step 3004. In addition, the damage estimator computing device 43 may compare the damage assessment model 42 to the received images of the vehicle, as shown at step 3006. At step 2908, the damage estimator computing device 43 may identify damage to the vehicle based on the received images of the vehicle and using the damage assessment model 42. In response to identifying the vehicle damage, the damage estimator computing device 43 may predict total labor costs, total parts costs, and total hours for repair of the vehicle based, as shown in steps 2910, 2912, and 2914, respectively.

The various embodiments of the non-transitory computer-readable storage media may include additional, fewer, or alternative components or actions, including those discussed elsewhere herein, and particularly the additional features discussed in the section describing the computer-implemented method.

IV. Exemplary Server Computing Device

Figure 31:
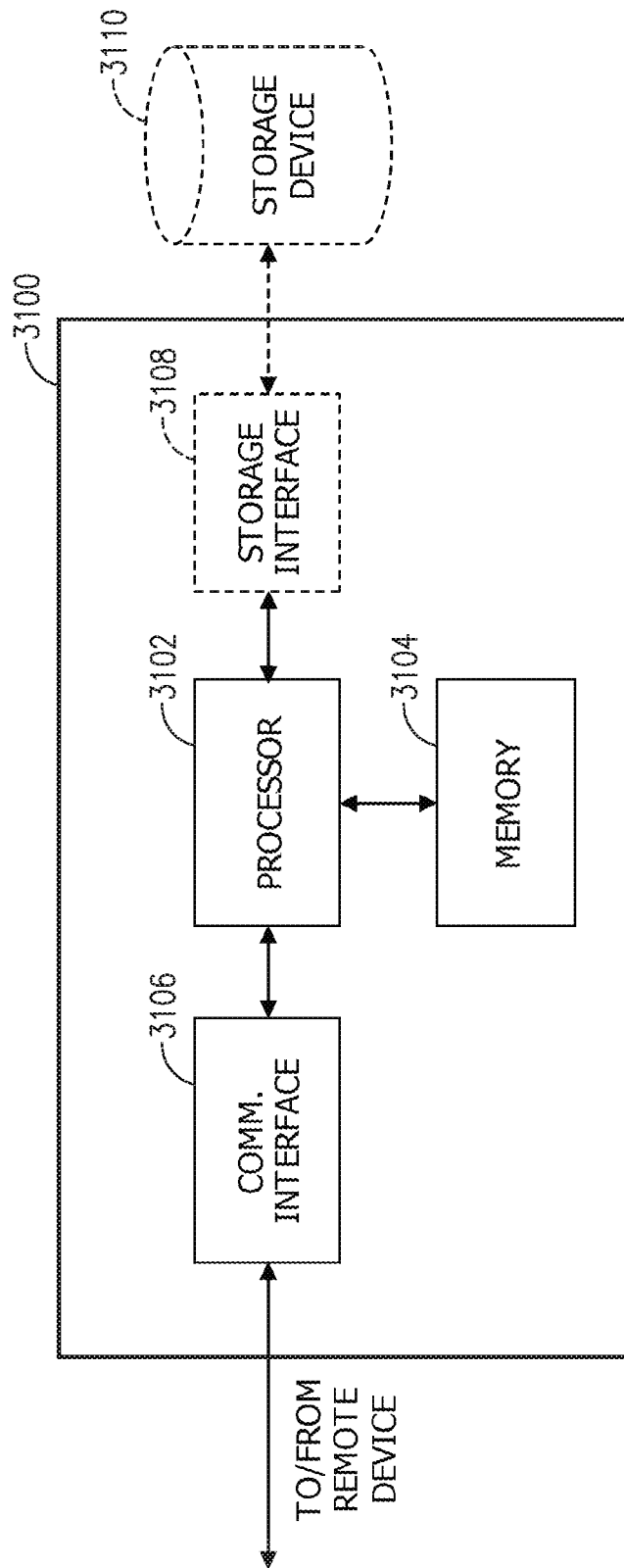
FIG. 31 is a schematic configuration of a server computing system that may be used with the methods shown in FIGS. 22-30.

FIG. 31 is an example configuration of a server computing system 3100, such as the damage estimator computing device 43 (shown in FIG. 4). The server system 3100 includes, but is not limited to, the database 28 (shown in FIG. 4) and the damage assessment model 42 (shown in FIG. 4). In the example embodiment, the server system 3100 includes a processing element 3102 for executing instructions. The instructions may be stored in a memory element 3104, for example. The processing element 3102 includes one or more processing units (e.g., in a multi-core configuration) for executing the instructions. The instructions may be executed within a variety of different operating systems on the server system 3100, such as UNIX, LINUX, Microsoft Windows®, etc. More specifically, the instructions may cause various data manipulations on data stored in a storage device 3110 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.).

The processing element 3102 is operatively coupled to a communication element 3106 such that the server system 3100 can communicate with a remote device such as the mobile device 26 (shown in FIG. 4) or another server system 3100. For example, the communication element 3106 may receive communications from the mobile device 26 via the communication network 24, as illustrated in FIG. 4.

The processing element 3102 is operatively coupled to the storage device 3110. The storage device 3110 is any computer-operated hardware suitable for storing and/or retrieving data. In some embodiments, the storage device 3110 is integrated in the server system 3100. In other embodiments, the storage device 3110 is external to the server system 3100 and is similar to the database 28. For example, the server system 3100 may include one or more hard disk drives as the storage device 3110. In other embodiments, the storage device 3110 is external to the server system 3100 and may be accessed by a plurality of server systems 3100. For example, the storage device 3110 may include multiple storage units such as hard disks or solid-state disks in a redundant array of inexpensive disks (RAID) configuration. The storage device 3110 may include a storage area network (SAN) and/or a network attached storage (NAS) system.

In some embodiments, the processing element 3102 is operatively coupled to the storage device 3110 via a storage interface 3108. The storage interface 3108 is any component capable of providing the processing element 3102 with access to the storage device 3110. The storage interface 3108 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processing element 3102 with access to the storage device 3110.

The memory element 3104 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

V. Machine Learning

The computer-implemented methods discussed herein may include additional, fewer, or alternate operations, including those discussed elsewhere herein. The methods may be implemented via one or more local or remote processing devices, communication elements, and/or sensors (such as processing elements, communication elements, and/or sensors mounted on mobile devices), and/or via computer-executable instructions stored on non-transitory computer-readable media.

Additionally, the computer systems discussed herein may include additional, fewer, or alternate functionality, including that discussed elsewhere herein. The computer systems discussed herein may include or be implemented via computer-executable instructions stored on non-transitory computer-readable media.

Machine learning techniques have been developed that allow parametric or nonparametric statistical analysis of large quantities of data. Such machine learning techniques may be used to automatically identify relevant variables (i.e., variables having statistical significance or a sufficient degree of explanatory power) from data sets. This may include identifying relevant variables or estimating the effect of such variables that indicate actual observations in the data set. This may also include identifying latent variables not directly observed in the data, viz. variables inferred from the observed data points. In some embodiments, the methods and systems described herein may use machine learning techniques to identify and estimate the effects of observed or latent variables such as type of vehicle involved in a collision, type of vehicle damage, and/or amount of vehicle damage associated with a vehicle collision, or other such variables that influence the assessment of damage associated with vehicle collisions or vehicle travel.

Some embodiments described herein may include automated machine learning to determine vehicle damage. Although the methods described elsewhere herein may not directly mention machine learning techniques, such methods may be read to include such machine learning for any determination or processing of data that may be accomplished using such techniques. In some embodiments, such machine-learning techniques may be implemented automatically upon occurrence of certain events or upon certain conditions being met. Use of machine learning techniques, as described herein, may begin with training a machine learning program, or such techniques may begin with a previously trained machine learning program.

A processing element or processor may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, historical claim, vehicle parts, and/or vehicle repair data. The machine learning programs may utilize deep learning algorithms that may be primarily focused on pattern recognition and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the vehicle from image data and/or other data.

In one embodiment, a processing element may be trained by providing it with a large sample of historical image data from previous claims with known characteristics or features. Such information may include, for example, vehicle make, model, year, and/or parts replaced or repairs and corresponding repair costs.

Based upon these analyses, the processing element may learn how to identify characteristics and patterns that may then be applied to analyzing image data and/or other data. For example, the processing element may learn, with the user's permission or affirmative consent, to identify the user based upon the user's device or login information. The processing element may also learn how to identify different types of vehicle damage caused by accidents and vehicular crashes based upon differences in image data. The processing element may further learn how to estimate a repair cost for a damaged vehicle based upon partial or incomplete information (e.g., hidden damage) and determine a level of certainty that the estimation is correct. As a result, the processing element may automatically and accurately determine a level of damage to a vehicle based on image data, provide an estimate of the cost of repair, provide a parts list of parts that need repair and/or replacement, and automatically initiate a damage claims based on the image data.

V. Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity or group of tangible entities, be that entities that are physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time. Moreover, the "processing element" may, unless more narrowly described, consist of multiple separate tangible pieces of hardware for operating in the described manner to perform certain operations described herein.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although embodiments of the present inventive concept have been described with reference to the illustrations in the attached drawing figures, it is noted that equivalents may be employed and substitutions made herein without departing from the scope of the present inventive concept as recited in the claims.

We claim:

1. A computer-implemented method for obtaining image data of a vehicle for damage assessment, the method comprising:
    providing, with a display of a mobile device, a user interface comprising instructions for a requested position of the mobile device relative to the vehicle for image capture, wherein the instructions are presented on a single screen of the user interface and wherein the instructions comprise:
        image guidance comprising an image of a view of the vehicle, wherein the view is capturable by the mobile device when the mobile device is in the requested position; and
        textual guidance comprising text describing relative distance between the mobile device and the vehicle when the mobile device is in the requested position;
    capturing image data of the vehicle with the mobile device while the mobile device is in the requested position, the mobile device having an orientation model for facilitating orienting the image data;
    analyzing, by the mobile device, the captured image data using the orientation model;
    determining, by the mobile device, an orientation of the captured image data using the orientation model;
    generating, by the mobile device, metadata based on the determined orientation, the metadata indicating the view of the vehicle in the captured image data;
    attaching, by the mobile device, the generated metadata indicating the view of the vehicle to the captured image data;
    determining, by the mobile device and using the orientation model, whether the captured image data can be used for the damage assessment based at least in part on the generated metadata; and
    transmitting, in response to a determination that the captured image data can be used for the damage assessment and using the mobile device, the captured image data to a damage estimator computing device.

2. The computer-implemented method of claim 1, further comprising determining, by the damage estimator computing device, whether a level of damage to the vehicle in the image data exceeds a predetermined threshold using a damage assessment model.

3. The computer-implemented method of claim 2, further comprising processing a damage claim based upon the determined level of damage.

4. The computer-implemented method of claim 2, wherein determining the level of damage to the vehicle comprises determining whether the vehicle is repairable.

5. The computer-implemented method of claim 4, wherein if the vehicle is determined to not be repairable, processing a damage claim indicating the vehicle is a total loss.

6. The computer-implemented method of claim 2, further comprising:
    based at least in part on determining that the level of damage exceeds the predetermined threshold, receiving a damage estimate.

7. The computer-implemented method of claim 1, wherein capturing image data of a vehicle with the mobile device comprises:
    analyzing data collected from an image sensor operating in a live view mode to determine a plurality of mobile device positions; and
    initiating an automatic capture of at least a part of the image data of the vehicle, in response to determining that a current mobile device position corresponds to the requested position.

8. The computer-implemented method of claim 1, wherein capturing image data of a vehicle with the mobile device comprises capturing video data.

9. The computer-implemented method of claim 1, wherein capturing image data of a vehicle with the mobile device comprises capturing single image data.

10. The computer-implemented method of claim 1, further comprising enabling an automatic capture by an image sensor of the mobile device for image capture of one or more views of the vehicle.

11. The computer-implemented method of claim 10, further comprising displaying a live view from the display of the mobile device of the vehicle for assistance in orienting the mobile device to capture an image that is a match of a view represented on the display of the mobile device.

12. The computer-implemented method of claim 11, further comprising determining by a mobile application of the mobile device a matched view for an automatic capture by the image sensor of the mobile device.

13. The computer-implemented method of claim 1, wherein the single screen of the user interface further comprises a user interface element selectable to capture replacement image data.

14. A damage assessment computing system for obtaining image data of a vehicle for damage assessment, the system comprising:
    a damage estimator computing device; and
    a mobile device comprising:
        a memory device for storing data;
        one or more sensors; and
        a processor coupled to the memory device and the one or more sensors, the processor configured to:
            provide, with a display of the mobile device, a user interface comprising instructions for a requested position of the mobile device relative to the vehicle for image capture, wherein the instructions are presented on a single screen of the user interface and wherein the instructions comprise:
                image guidance comprising a representative image of a view of the vehicle, wherein the view is capturable by the mobile device when the mobile device is in the requested position; and
                textual guidance comprising text describing relative distance between the mobile device and the vehicle when the mobile device is in the requested position;

capture image data of the vehicle while the mobile device is in the requested position by using the one or more sensors of the mobile device;

analyze the captured image data using an orientation model stored in the memory device;

determine an orientation of the captured image data using the orientation model;

generate metadata based on the determined orientation, the metadata indicating the view of the vehicle in the captured image data, the metadata comprising at least one selected from a group consisting of metadata indicating the view of a left front corner, metadata indicating a pose of a right front corner, metadata indicating the view of a left back corner, and metadata indicating the view of a right back corner;

attach the generated metadata indicating the view of the vehicle to the captured image data;

determine whether the captured image data can be used for the damage assessment using the orientation model based at least in part on the generated metadata; and transmit, in response to a determination that the captured image data can be used for the damage assessment, the captured image data to the damage estimator computing device.

15. The system of claim 14, wherein said damage estimator computing device comprises a processor programmed to determine, using a damage assessment model, a level of damage to the vehicle in the image data exceeds a threshold based on the orientation of the captured image data.

16. The system of claim 15, wherein the processor of the damage estimator computing device is further programmed to process a damage claim based upon the determined level of damage.

17. The system of claim 14, wherein the processor is further configured to:

analyze data collected from the one or more sensors operating in a live view mode to determine a plurality of mobile device positions; and initiating an automatic capture at least a part of the image data of the vehicle, in response to determining that a current mobile device position corresponds to the requested position.

18. The system of claim 14, wherein the captured image data comprises video data.

19. The system of claim 18, wherein the processor is further configured to extract one or more images from the video data.

20. The system of claim 14, the captured image data comprises single image data.

21. Non-transitory computer-readable storage media having computer-executable instructions stored thereon, when executed by at least one processor, the computer-executable instructions cause the processor to:

provide, with a display of a mobile device, a user interface comprising instructions for a requested position of the mobile device relative to a vehicle for image capture, wherein the instructions are presented on a single screen of the user interface and wherein the instructions comprise:

image guidance comprising a representative image of a view of a vehicle, wherein the view is capturable by the mobile device when the mobile device is in the requested position; and textual guidance comprising text describing relative distance between the mobile device and the vehicle when the mobile device is in the requested position;

capture image data of the vehicle while the mobile device is in the requested position using one or more sensors of the mobile device;

analyze the captured image data using an orientation model;

determine an orientation of the captured image data using the orientation model; generate metadata based on the determined orientation, the metadata indicating the view of the vehicle in the captured image data, the metadata comprising at least one selected from a group consisting of metadata indicating the view of a left front corner, metadata indicating the view of a right front corner, metadata indicating the view of a left back corner, and metadata indicating the view of a right back corner;

attach the generated metadata indicating the view of the vehicle to the captured image data;

determine whether the captured image data can be used for a damage assessment based at least in part on the generated metadata; and transmit, in response to a determination that the captured image data can be used for the damage assessment, the captured image data to a damage estimator computing device.

22. The computer-readable storage media of claim 21, wherein the computer-executable instructions further cause the processor to:

analyze data collected from the one or more sensors operating in a live view mode to determine a plurality of mobile device positions; and initiating an automatic capture at least a part of the image data of the vehicle, in response to determining that a current mobile device position corresponds to the requested position.

23. The computer-readable storage media of claim 21, wherein the captured image data comprises video data, wherein the computer-executable instructions further cause the processor to extract one or more images from the video data.

* * * * *